May 13, 1941. A. THOMAS 2,242,095
CALCULATING MACHINE
Filed Oct. 1, 1937 17 Sheets-Sheet 1

INVENTOR
A. THOMAS.
BY
ATTORNEY

May 13, 1941.  A. THOMAS  2,242,095
CALCULATING MACHINE
Filed Oct. 1, 1937  17 Sheets-Sheet 2

INVENTOR
A. THOMAS.
BY
Sydney E. Page.
ATTORNEY

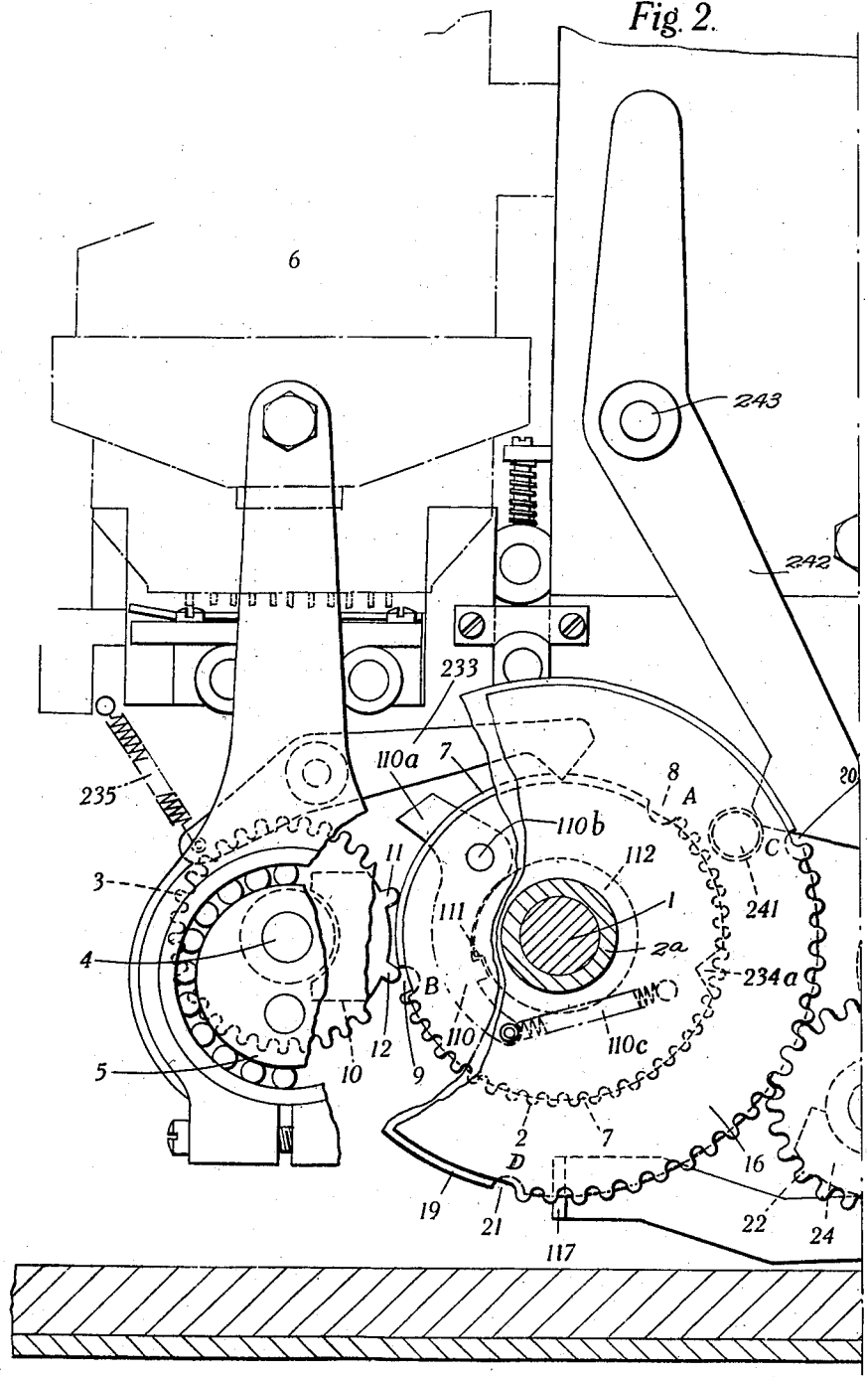

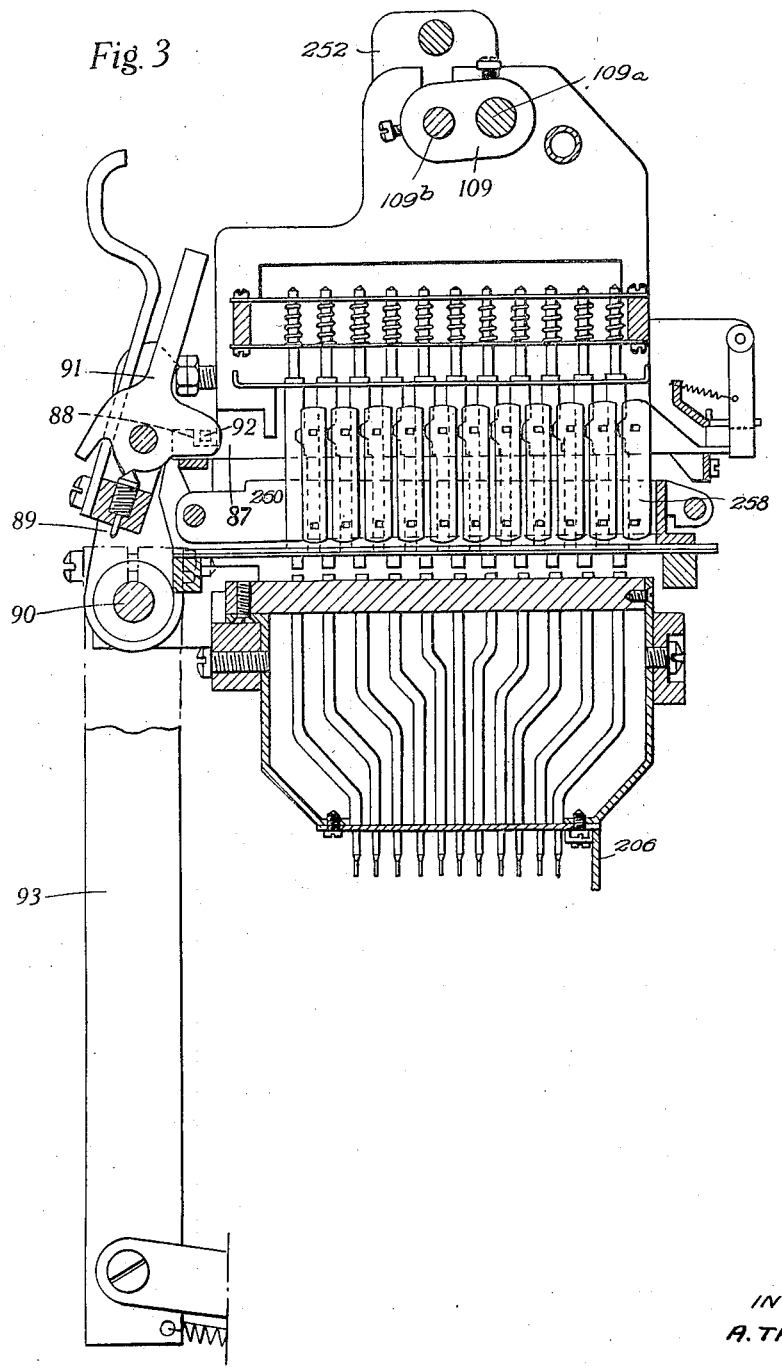

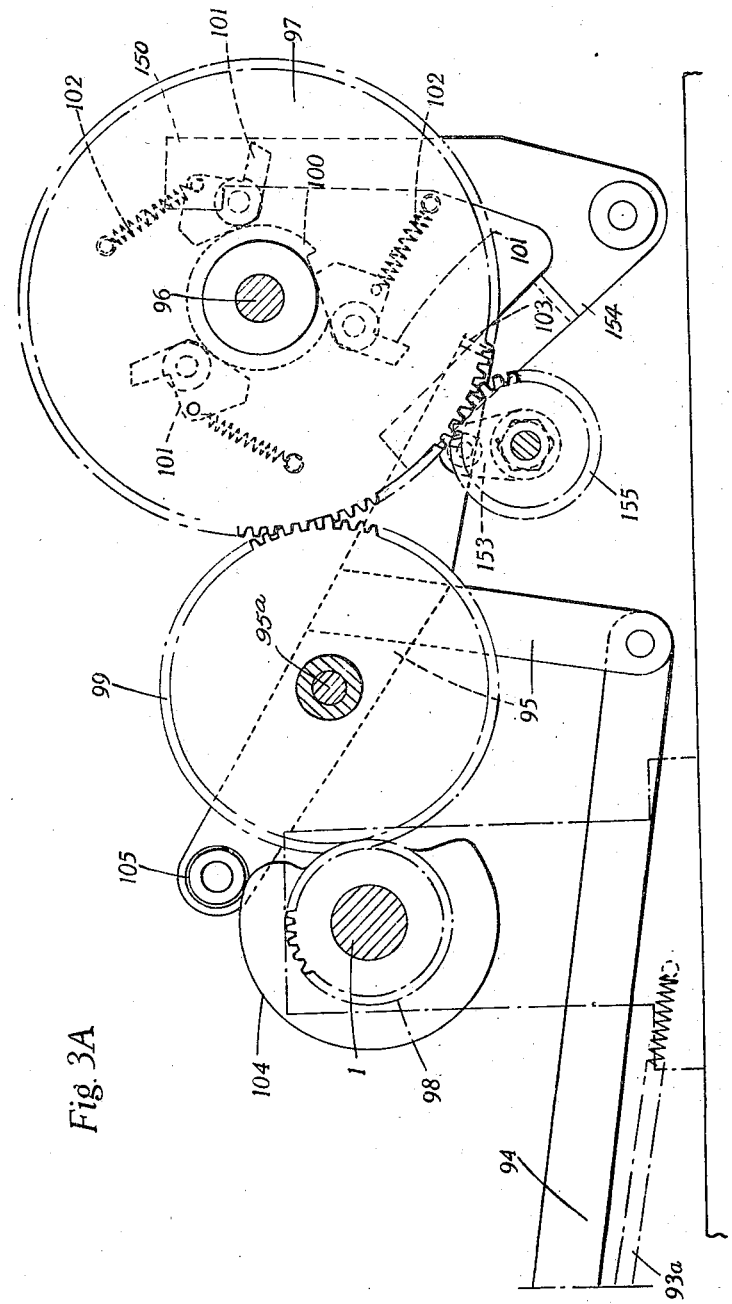

May 13, 1941.  A. THOMAS  2,242,095
CALCULATING MACHINE
Filed Oct. 1, 1937  17 Sheets-Sheet 7

INVENTOR
A. THOMAS.
BY
Sydney E. Page.
ATTORNEY

May 13, 1941.  A. THOMAS  2,242,095
CALCULATING MACHINE
Filed Oct. 1, 1937  17 Sheets-Sheet 8
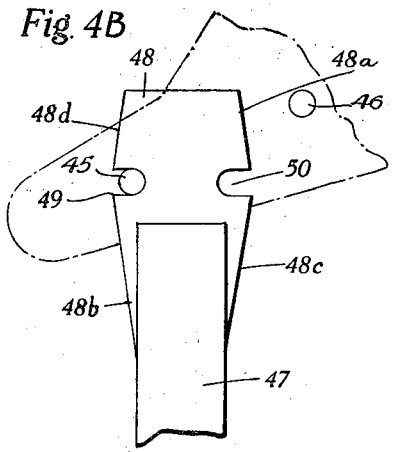
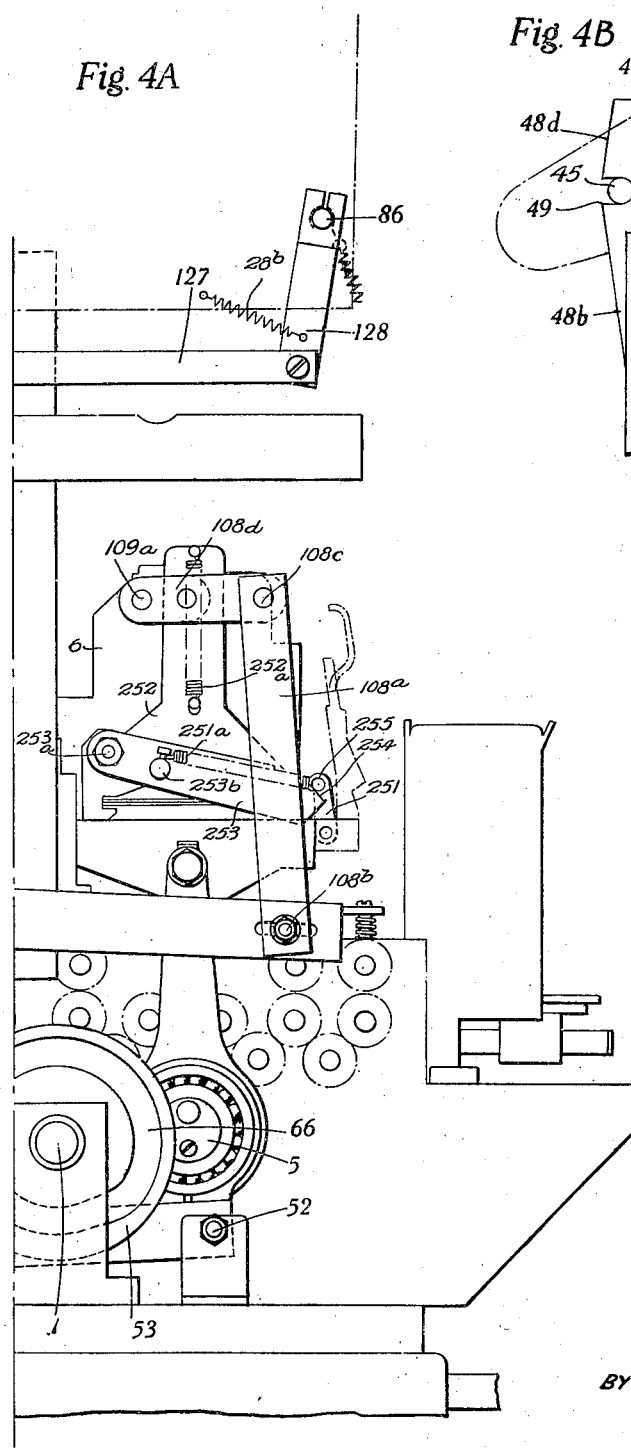
INVENTOR
A. THOMAS.
BY Sydney E. Page.
ATTORNEY

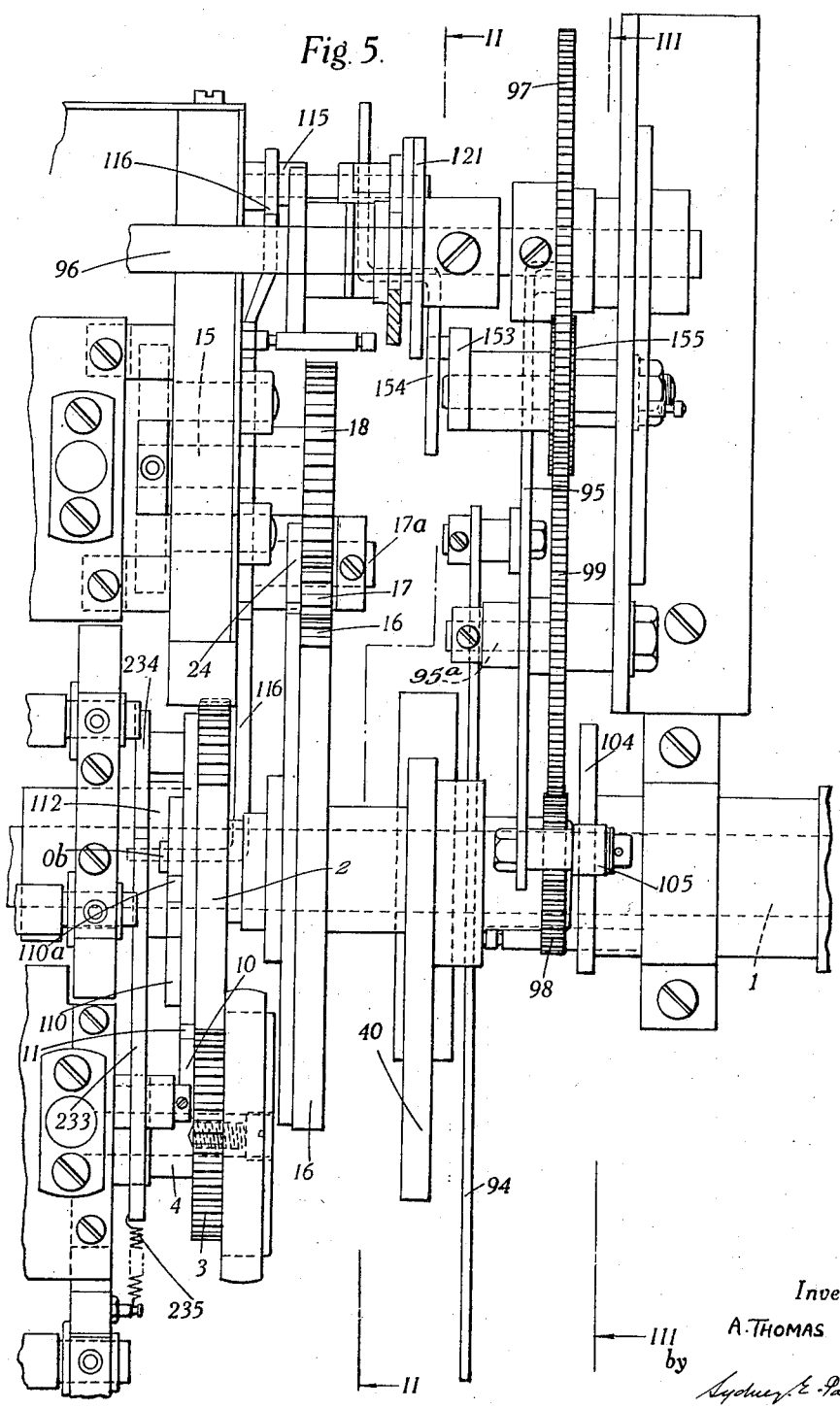

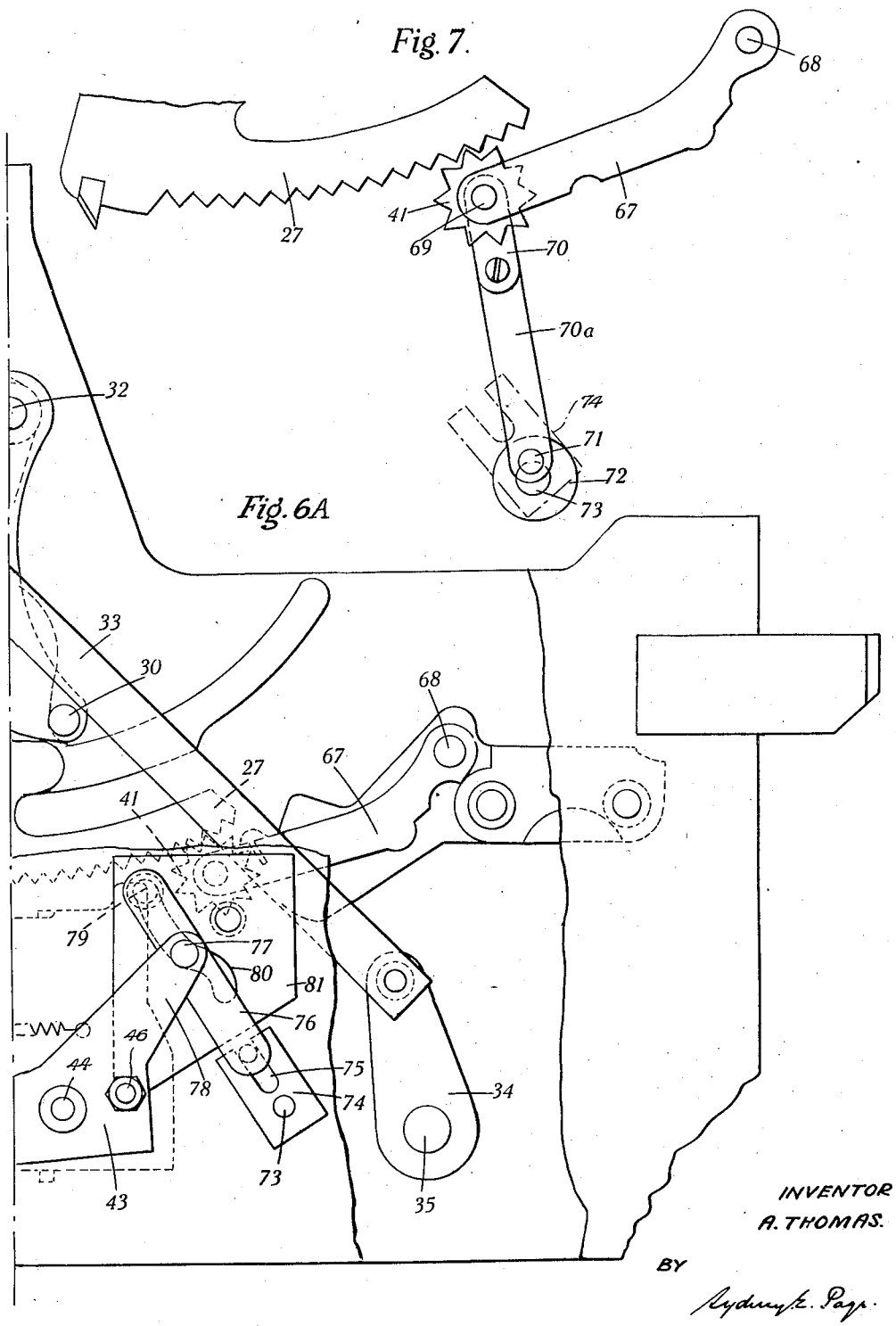

INVENTOR
A. THOMAS.
BY
Sydney E. Page.
ATTORNEY

May 13, 1941.  A. THOMAS  2,242,095
CALCULATING MACHINE
Filed Oct. 1, 1937    17 Sheets-Sheet 13

Inventor
A. Thomas
by Sydney E. Page
Attorney

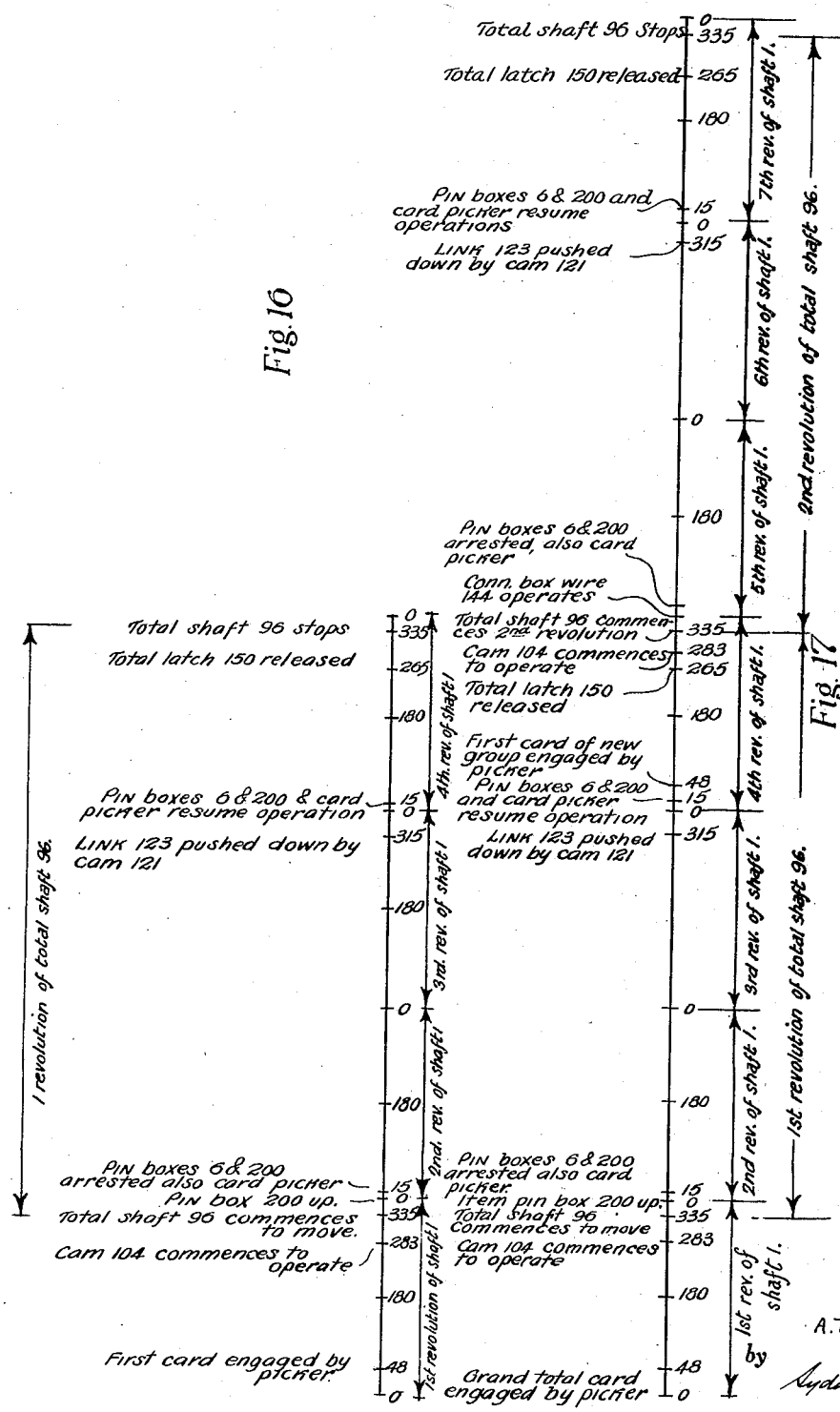

Patented May 13, 1941

2,242,095

UNITED STATES PATENT OFFICE 2,242,095

CALCULATING MACHINE

Arthur Thomas, Wallington, England, assignor to Powers Accounting Machines Limited, London, England, a company of Great Britain Application October 1, 1937, Serial No. 166,822
In Great Britain October 10, 1936

1 Claim. (Cl. 235—61.6)

This invention relates to calculating machines.

According to the present invention a calculating machine comprises two accumulators each provided with a set of denominational actuators, the actuators of one accumulator being set directly from settable stops projected into their path and connected to the actuators of the other accumulator, means for engaging both accumulators with their actuators simultaneously during each machine cycle, after said actuators have been set from the stops, means operative during a total taking operation and tending to cause both accumulators to engage with their actuators prior to the movement of the latter from normal position, means for causing two operations of the total taking mechanism to occur successively and interlocking mechanism operative during total taking operations preventing one accumulator from engaging with its actuators when the other accumulator is in engagement with its actuators and vice versa.

In order that the invention may be more completely understood a preferred embodiment according thereto will now be described with reference to the accompanying drawings which illustrate the invention as applied to a record card controlled tabulating machine wherein the total taking mechanism is under the control of a designation sensing pin box such as that described in U. S. patent specification No. 1,661,684, issued March 6, 1928.

In the drawings:

Figs. 1 and 1A together show the lower portion of the tabulator in elevation viewed from the right hand side;

Figs. 2 and 2A together form a view in cross section on the line II—II in Fig. 5 and show the details of the driving mechanism for the sensing pin boxes;

Figs. 3 and 3A together illustrate the drive for the total shaft and the means for controlling said shaft from the designation sensing pin box, the drive for the total shaft being shown in cross section on the line III—III of Fig. 5;

Figs. 4 and 4A together show the lower portion of the tabulator in elevation viewed from the left hand side and include the mechanism for controlling the timing of the engagement of the accumulator wheels with their actuators;

Fig. 5 is a plan of the driving mechanism for the pin boxes and the total shaft;

Figure 8:
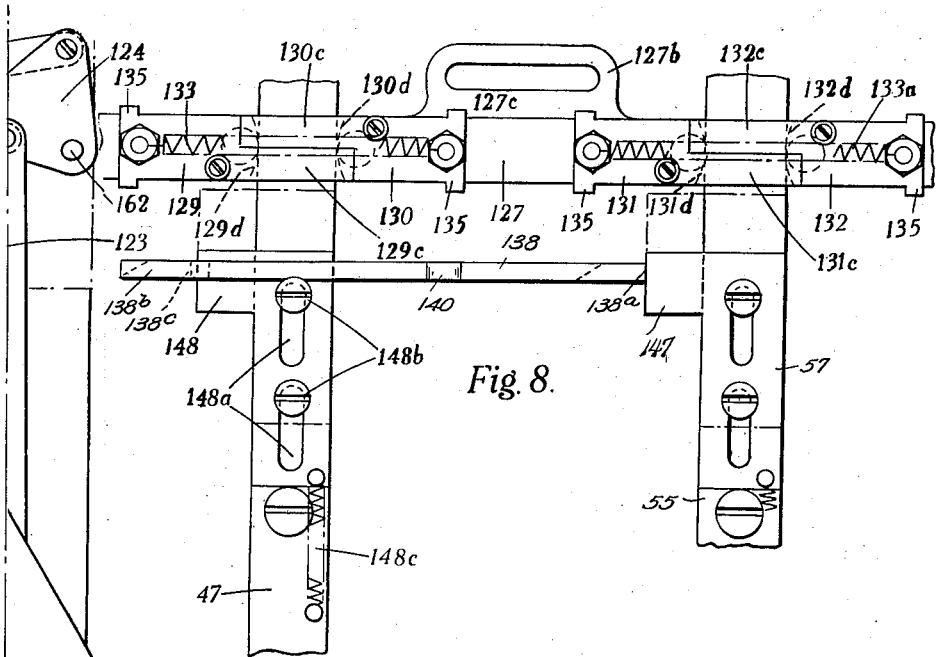
Figure 1A:
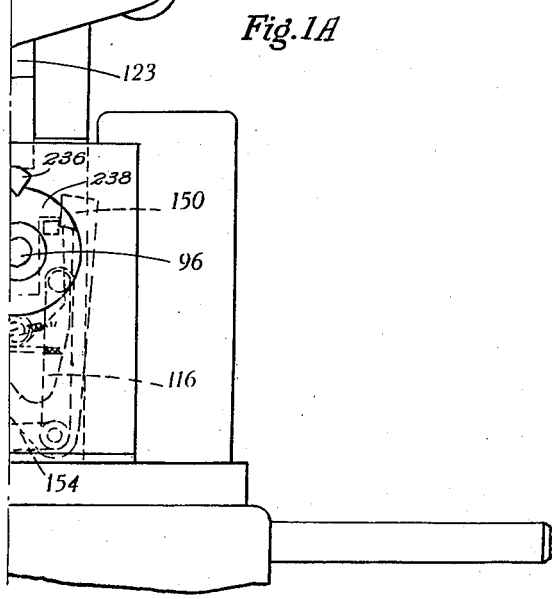
Figure 4C:
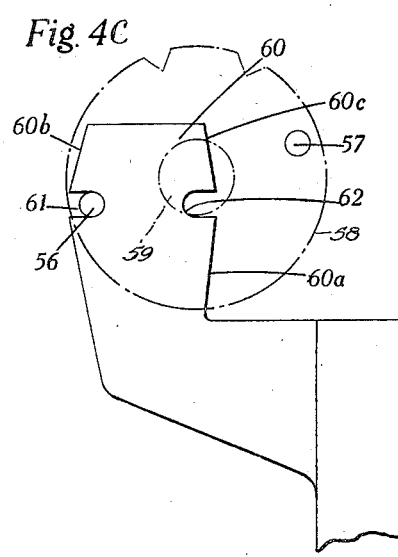
Figs. 4B and 4C show details of the mechanism for controlling the engagement of the accumulator wheels with their actuators.
Figure 4:
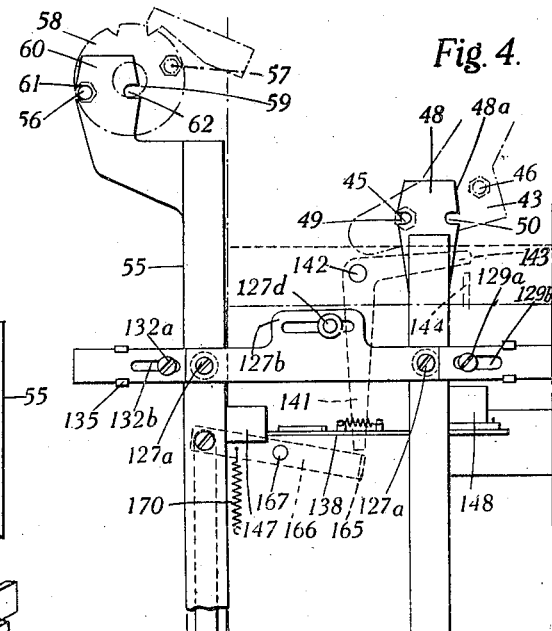
Figure 12:
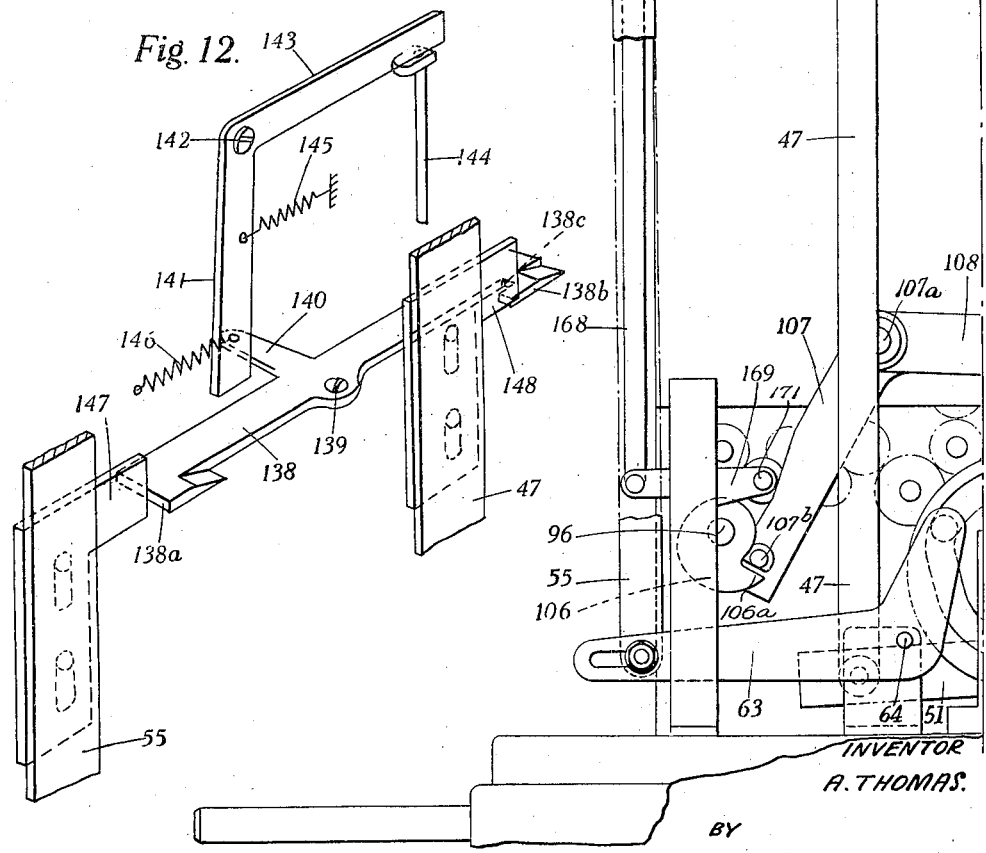
Figure 6:
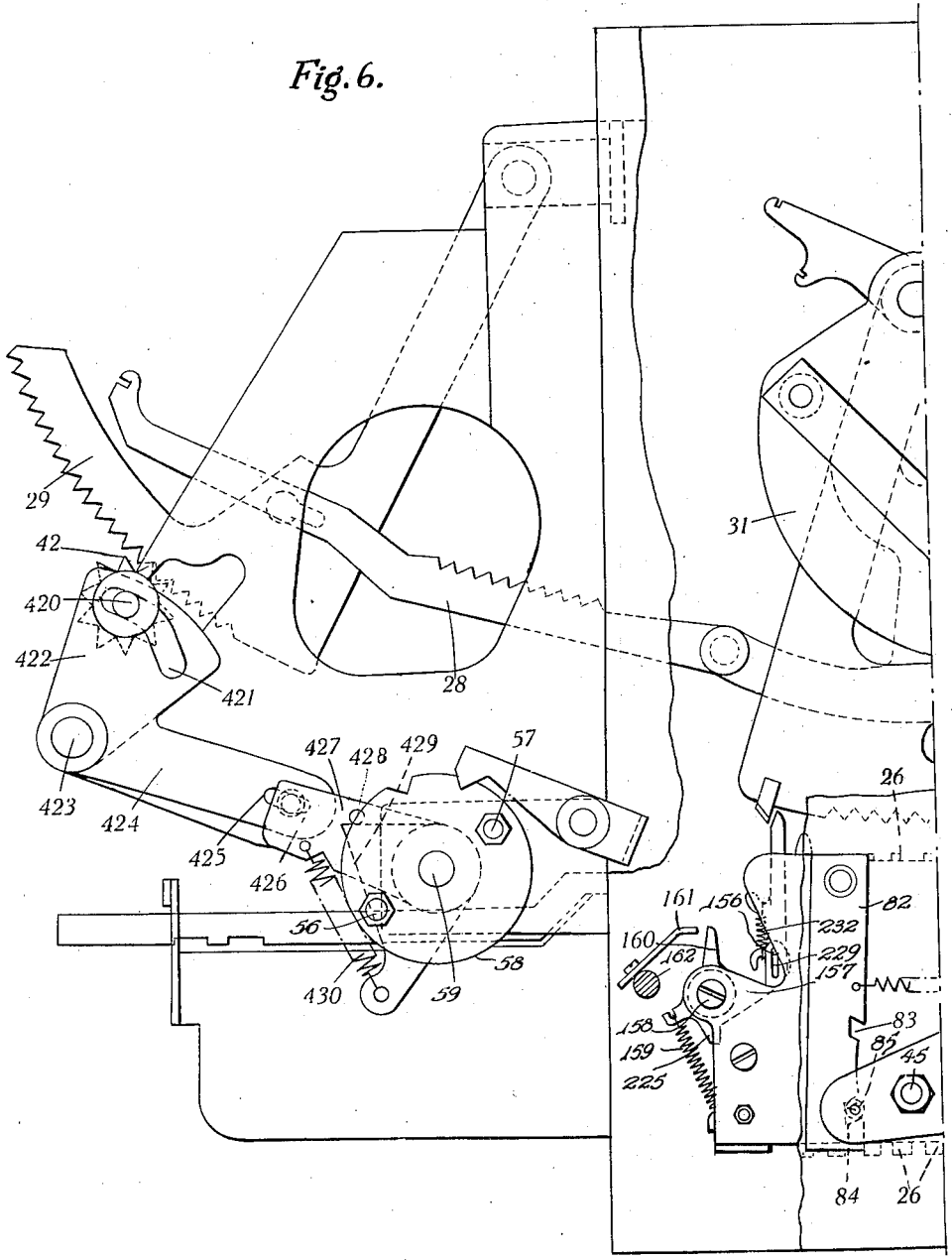
Figure 9:
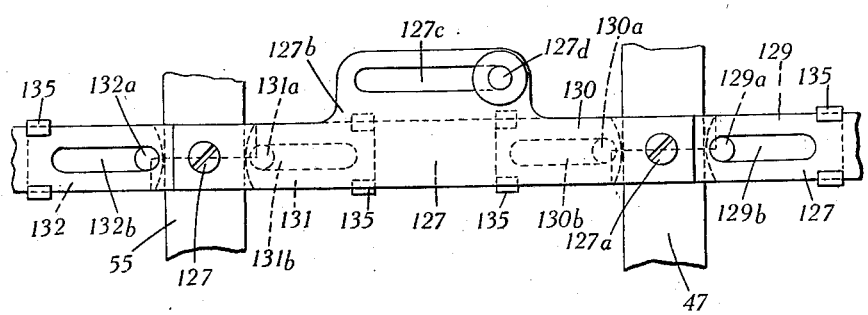
Figure 10:
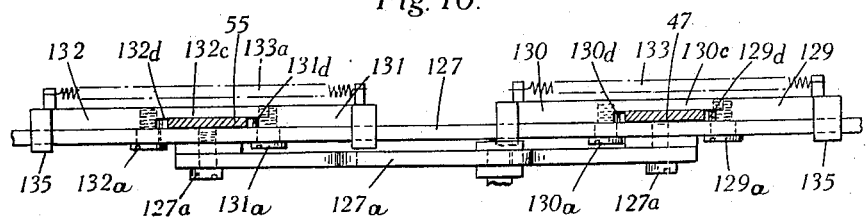
Figure 11:
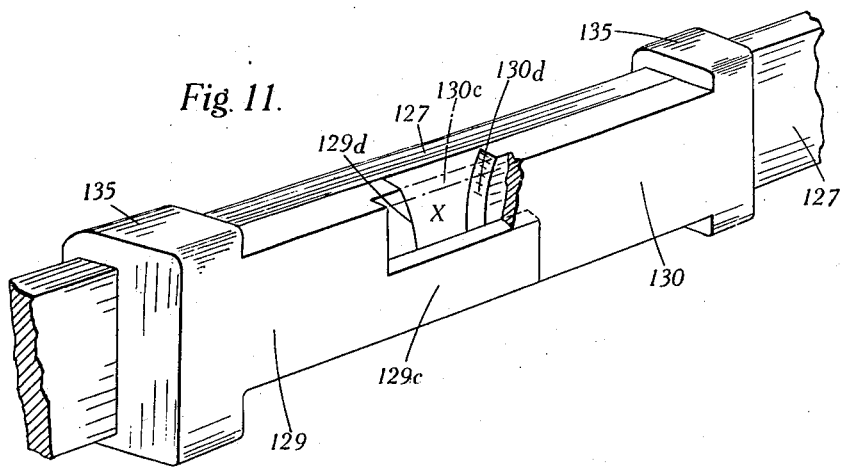
Figure 13:
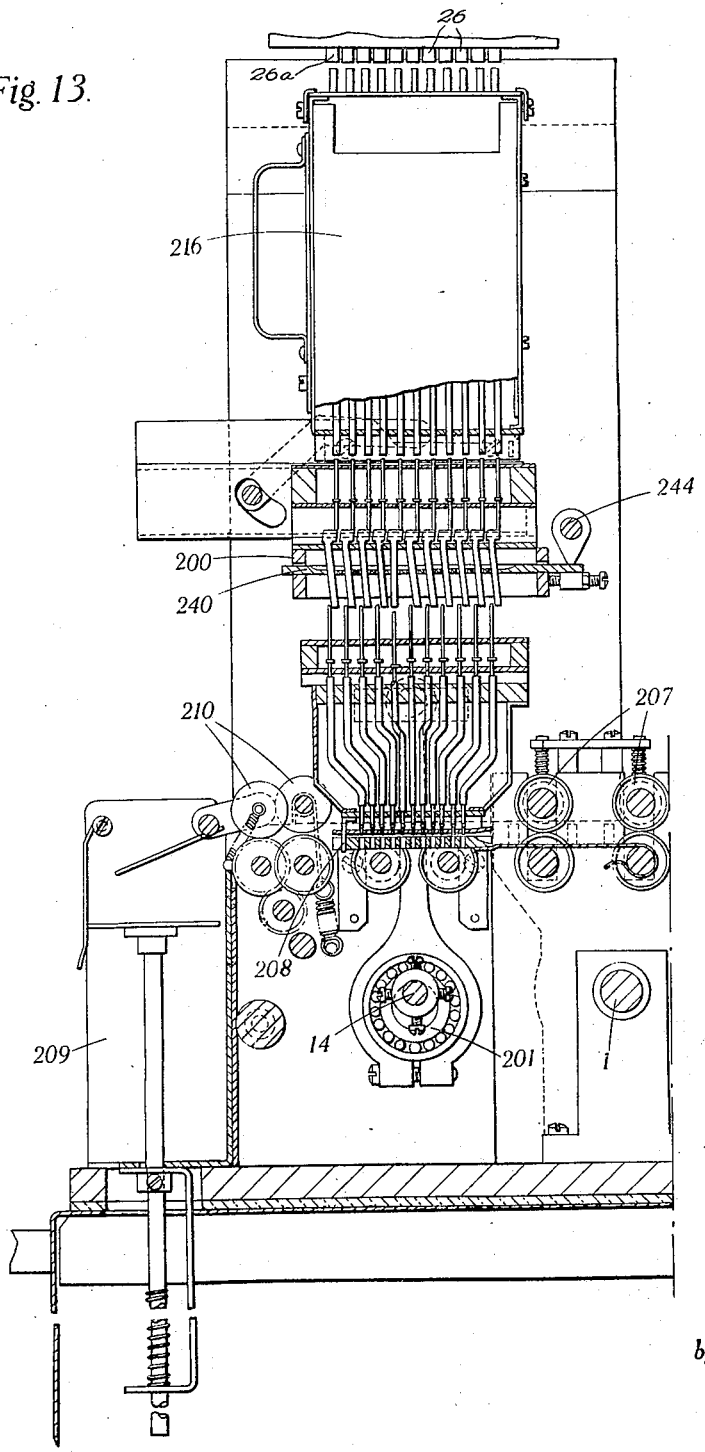
Figure 13A:
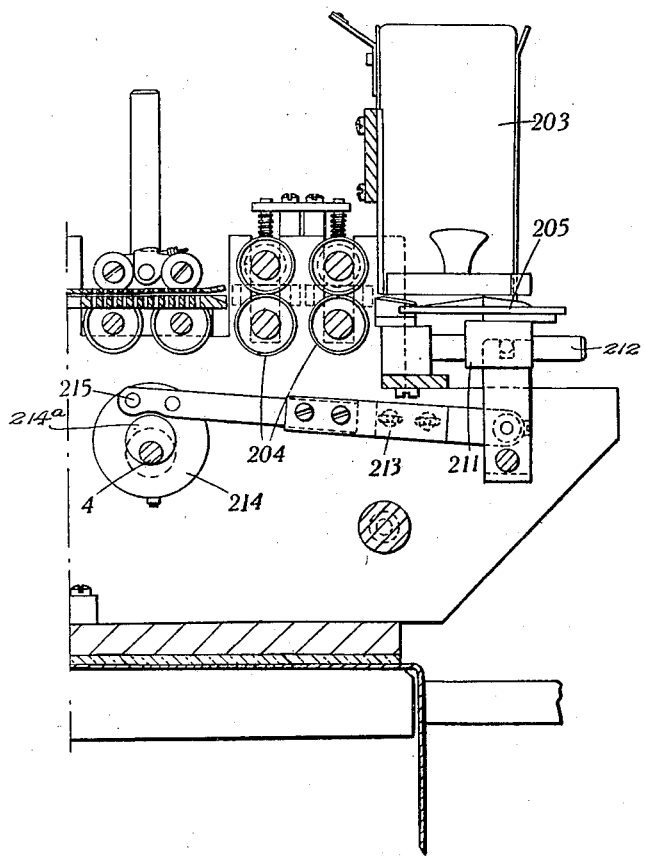
Figure 14:
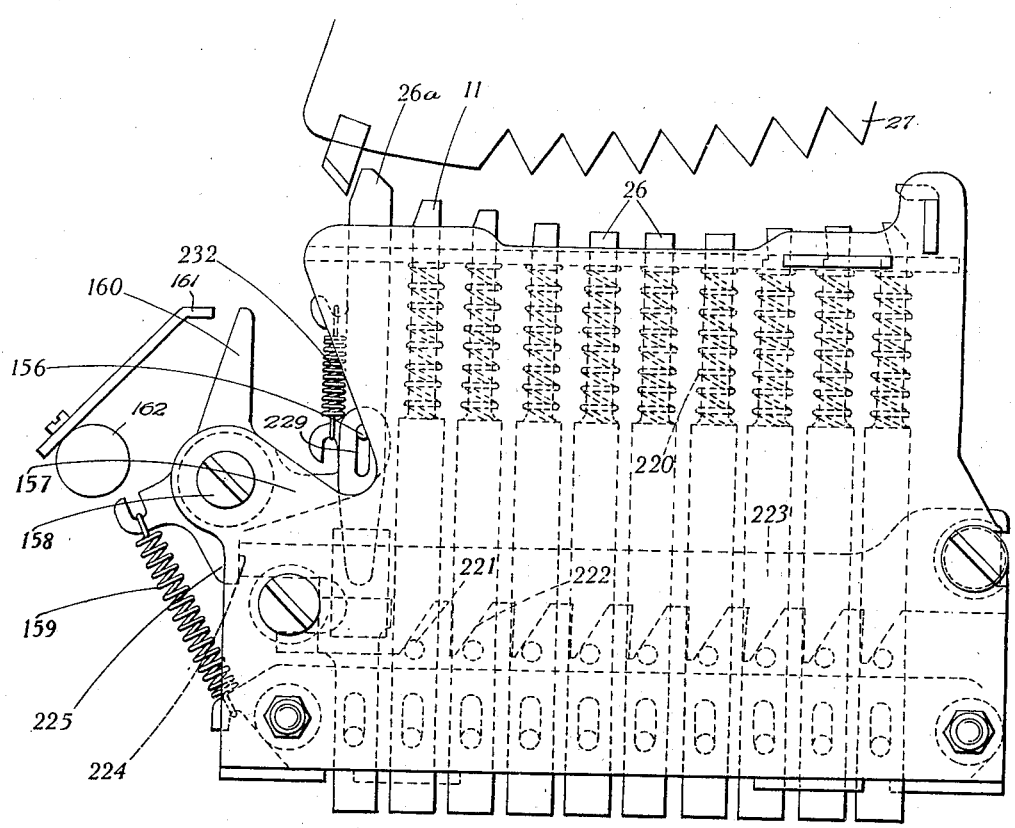
Figure 15:
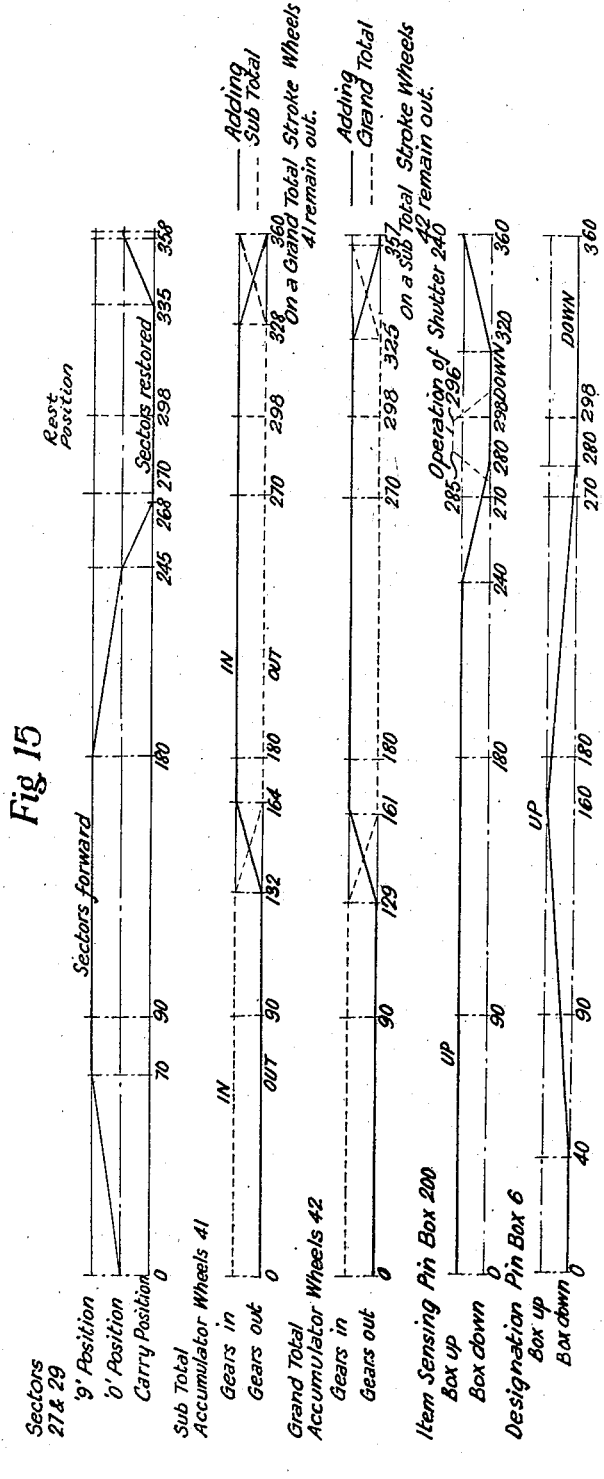

Figs. 6 and 6A together show the upper part of the machine in elevation from the left hand side with part of the side plate removed to show the accumulator control mechanism;

Fig. 7 shows a detail of the mechanism for effecting engagement of the sub total accumulator wheels with their actuators;

Fig. 8 is a view to a larger scale showing part of the mechanism for controlling the timing of the engagement of the accumulator wheels with their actuators, viewed from the side opposite from that seen in Fig. 4;

Fig. 9 shows the mechanism shown in Fig. 8 viewed from the same side as that seen in Fig. 4;

Fig. 10 is a plan of the mechanism of Fig. 9;

Fig. 11 shows to an enlarged scale a detail of the mechanism shown in Figs. 8 to 10;

Fig. 12 shows a further detail of the mechanism for controlling the timing of the engagement of the accumulator wheels with their actuators, and Fig. 13 and 13A together illustrate the base of the machine in cross section;

Fig. 14 illustrates the stop basket;

Fig. 15 is a timing diagram showing the operation of the adding mechanism during one revolution of the main shaft;

Figure 16 is a timing diagram of four consecutive revolutions of the main shaft, including a sub-total taking operation;

Figure 17 is a timing diagram of seven consecutive revolutions of the main shaft including a sub-total taking operation followed by a grand total taking operation.

In the construction shown in the drawings the machine comprises a base portion in which is mounted the main drive shaft 1 to which is secured a gear wheel 2.

Secured to a sleeve 2a freely mounted on the main shaft 1 of the tabulator is a gear wheel 2 (Fig. 2) driving a second gear wheel 3 secured to a shaft 4 on which are mounted the eccentrics 5 for reciprocating the designation pin box 6 which detects changes in designation in the cards. The designation pin box 6 is constructed in substantially the same manner as that described in U. S. patent specification No. 1,661,684. The mechanism for reciprocating the pin box is, however, constructed in the following manner:

The sleeve 2a is normally driven from the main shaft 1 through a pawl 110 pivoted to the wheel 2 at 110b and normally held by spring 110c in engagement with a tooth 111 on a clutch disc 112 secured to the main shaft 1.

In order that the designating pin box may remain at rest while the holes on one card are being compared with the records retained in the pin box of the holes in the first card of a group the driving gear wheel 2 has a certain number of teeth removed between the points A and B so that during the period in which the designating pin box remains stationary there is no connection between its driving eccentric and the main shaft. In order to prevent movement between the two gear wheels 2 and 3 a disc 7 is secured to the side of the driving gear wheel 2 and has the same diameter as the pitch circle of this gear wheel. This disc has two recesses 8 and 9, one located at each end of the portion A—B of the driving gear wheel which is formed without teeth, and secured to the driven gear wheel is a plate 10 having two projections 11, 12. While the driving gear wheel 2 rotates and turns the driven gear wheel 3 the plate 10 secured to the driven wheel comes round until at the moment when the mutilated portion A—B of the driving wheel 2 reaches the driven wheel 3 the two projections 11, 12 on the plate 10 which is secured to the latter come into engagement with the periphery of the disc 7 secured to the driving wheel, whereby the driven wheel 3 is locked until the driving wheel 2 has turned sufficiently to bring the recess 8 in the disc 7 attached thereto into engagement with the projection 11 on the plate 10 secured to the driven wheel. When this engagement occurs the driven wheel is turned sufficiently to cause re-engagement of its teeth with the teeth on the driving wheel.

The item sensing pin box indicated generally at 200 in Fig. 13, is of the form described in British patent specification No. 401,012 and is reciprocated by means of eccentrics 201 secured to a shaft 15 driven from the main shaft 1 through gear wheels 16, 17 and 18, of which the wheel 16 is secured to the sleeve 2a.

The gear wheel 16 has the teeth cut away over a portion of its periphery between the points C and D and a disc 19 is secured to the side of this gear wheel 16. This disc has two recesses 20 and 21 and co-operates with projections 22 and 23 on a plate 24 attached to the intermediate wheel 17 which is mounted on a stub shaft 17a, the action being similar to that of the disc 7 and plate 10 already described. By this means the item sensing pin box is caused to move rapidly down on to the card and up again, whereby the item read from the card is retained in the pin box.

The cards are fed from a magazine 203 (Fig. 13A) to feed rolls 204 by a picker 205 and the feed rolls 204 convey the cards to the designation pin box 6 where they are arrested by a card stop 206 of usual form attached to the pin box 6 so as to move up and down with it.

From the pin box 6 the cards are conveyed by feed rolls 207 to the item sensing pin box 200 in which they are arrested by a card stop 208 attached to pin box 200. From the pin box 200 the cards are discharged to a receiver 209 by feed rolls 210.

The picker 205 is carried on a block 211 mounted to slide horizontally on two rods 212 of which only one appears in Fig. 13A, and the block 211 is reciprocated by means of a link 213 operated by an eccentric 214 secured to the shaft 15 and having a sheave 214a to which the link 213 is pivoted at 215.

Mounted above the item pin box 200 is a connection box 216 (Fig. 13) through which the items sensed from the cards are transmitted by wires 217 in the usual manner to the stops 26 in the stop basket (Figs. 6 and 14).

The stop basket, which is arranged to handle cards punched with one hole to represent each digit is a modification of the basket shown in Fig. 8 of U. S. patent specification No. 2,140,136 issued December 13, 1938.

As can be seen from Fig. 14 each stop 26 except the nought stop 26a is normally held down by a spring 220 and carries a pin 221 co-operating with a cam face 222 on a slide 223 of which the end 224 abuts against a tail 225 of a bell crank 157, 160 pivoted on a shaft 158 mounted in the basket frame. One arm 157 of the bell crank carries a pin 156 engaging in a slot 229 in the nought stop 26a and the other arm of said bell crank is normally disposed adjacent a bail 161 secured to the back total shaft 162 of the machine (Fig. 6). A spring 159 maintains the bell crank in the position shown in Fig. 14 and a spring 232 attached to the nought stop 26a maintains the upper end of the slot 229 in engagement with the pin 156.

When any stop 26 is raised by the action of a sensing pin finding a hole in a card its pin 221 acts on the cam surface 222 and pushes the slide 223 to the left in Fig. 14 whereby the bell crank 157, 160 is rocked clockwise. This movement of the bell crank causes the arm 157 thereof to pull the nought stop 26a downwards through the action of the spring 232 thereby releasing the associated sector 27 so that the latter can move up to the stop 26 which has been set from the card.

In the machine now being described there is one front accumulator which receives items from the card and accumulates sub-totals and one rear accumulator which accumulates grand totals.

The sectors 27 (Fig. 6A) of the front (or sub-total) accumulator are connected by links 28 to the sectors 29 of the rear (or grand total) accumulator and the wheels of both accumulators are so controlled that on each adding cycle both sets of wheels are engaged with their sectors after the latter have been set from the stops 26. The sub-total sectors 27 are set directly from the stops and the grand total sectors 29 are set indirectly from the stops through the agency of the front sectors.

Figure 1:
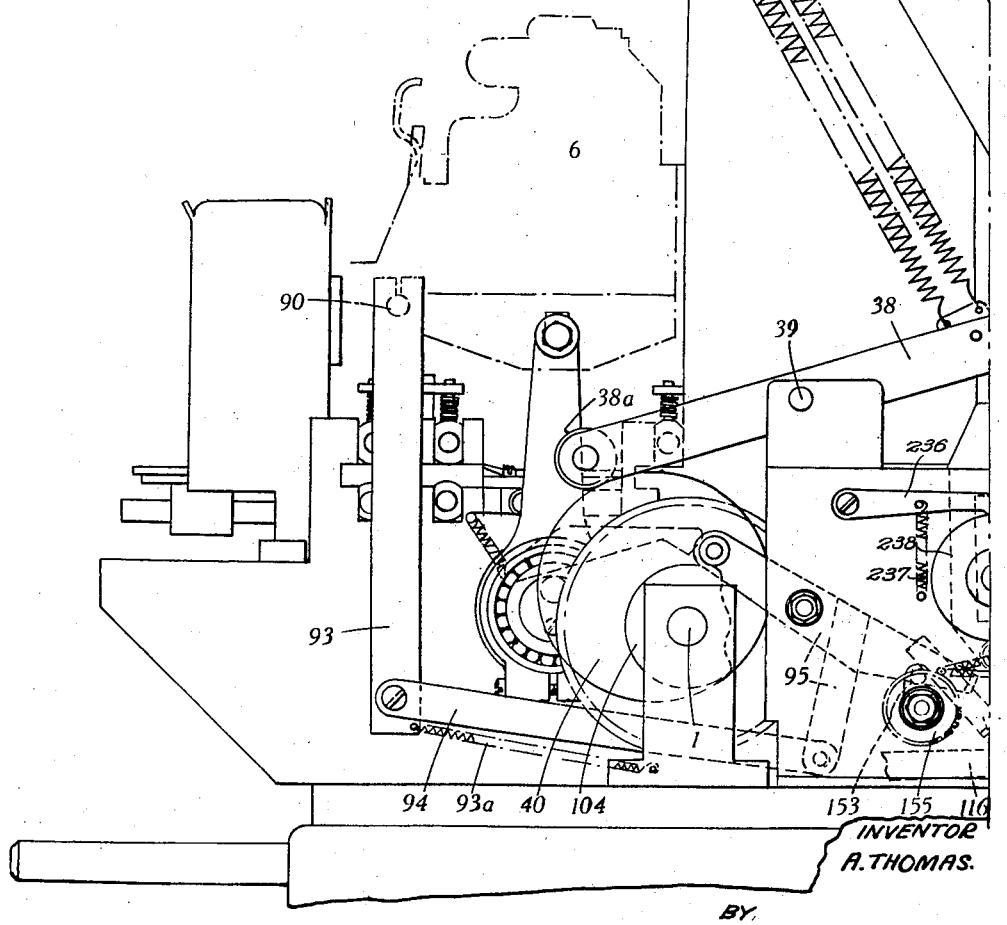

The sectors 27 and 29 are held in their restored positions by a restoring bar 30 carried between arms 31 pivoted at 32 to the machine frame, these arms being connected by links 33 to arms 34 secured to a sector restoring shaft 35 (Figs. 1 and 6A). The shaft 35 is oscillated from the main shaft 1 by means of an arm 36 (Fig. 1) secured to the shaft 35 and connected by a link 37 to one end of a lever 38 pivoted to the frame at 39 and of which the other end carries a roll 38a engaging a cam 40 secured to the main shaft 1.

The front or sub-total accumulator wheels are indicated at 41 and the rear or grand total accumulator wheels at 42 (Fig. 6).

In order to control the engagement and disengagement of the front accumulator wheels 41 a rocking plate 43 is pivoted to the frame at 44 and carries two projecting pins 45, 46, one on each side of the centre about which it rocks. Passing between these two pins is a vertical link 47 (Fig. 4), hereinafter referred to as the sub-total link having a head 48 provided with two slots 49, 50, one at each side.

The sub-total link 47 is pivoted at its lower end to a lever 51 pivoted to the machine frame at 52 and carrying a roller engaging in a cam track formed in the rear face of a disc 53 fast to the main shaft 1. By this means the sub total link 47 is reciprocated once for each revolution of the main shaft. The head 48 lies between the two pins 45, 46 on the rocking plate and the slots 49, 50 co-operate with the pins 45, 46 in a manner which will be described later to rock the plate 43 clockwise or anti-clockwise. A clockwise movement of the plate 43 moves the accumulator wheels 41 out of engagement with the sectors 27, and a counterclockwise movement of the plate 43 moves the wheels 41 into engagement.

The mechanism which is operated by the rocking plate 43 to engage and disengage the sub-total accumulator wheels 41 forms no part of the present invention and is fully described in my co-pending patent application Serial No. 166,823 entitled "Improvements in calculating machines," filed October 1, 1937 (now Patent No. 2,198,708 issued April 30, 1940). In order to enable the present invention to be fully understood, however, a brief description of this mechanism will now be given.

The accumulator wheels 41 are carried between a pair of arms 67 pivoted to the machine frame at 68 and extending substantially horizontally below the toothed sectors 27 with which the wheels are to engage. Extending between the two arms 67 is the shaft 69 on which the wheels 41 rotate. At the centre of this shaft 69 is pivoted an element 70 which is rigidly connected to an extension 70a pivoted at its lower end to a crank pin 71 on a disc 72 secured to a crank shaft 73 rotatably mounted in the machine frame (Figs. 6A and 7).

Secured to one end of this shaft 73 is an arm 74 pivoted by a pin and slot connection 75 to an operating lever 76 which is pivoted at a point 77 between its ends to an arm 78 projecting from the rocking plate 43 which is actuated by the sub-total link 47.

The end of the operating lever 76 remote from the arm 74 on the crank shaft carries a pin 79 engaging in a cam slot 80 formed in a plate 81 fixed to the machine frame, this cam slot being shaped to constrain the operating lever to execute a predetermined motion when displaced longitudinally.

When the accumulator wheels are in engagement with their sectors 27 the crank pin 71 is in its uppermost position (Fig. 7) and the arm 74 on the crank shaft 73 is in line with the operating lever 76, the pin 79 on the latter being at the end of the cam slot 80 which is remote from the arm 74 (Fig. 6).

To cause disengagement of the accumulator wheels the actuating plate 43 is rocked clockwise whereby the operating lever 76 is moved longitudinally towards the arm 74 on the crank shaft. As the operating lever moves, the cam slot 80 causes it to swing about the pivot 77 whereby it is attached to the arm 78 projecting from the rocking actuating plate. This swinging movement combined with the longitudinal movement causes the end of the operating lever which is pivoted on the arm 74 on the crank shaft to swing in an approximately circular path about the crank shaft as centre, whereby the arm on the crank shaft and the shaft 173 itself are turned through 180°, the pin and slot connection 75 between the operating lever 76 and the arm 74 allowing for any discrepancy between the purely circular motion of the arm 74 and the actual path followed by the end of the operating lever. A spring loaded detent lever 82 having two recesses 83, 84 for engagement with a pin 85 on the plate 43 serves to retain the latter in either of its two positions.

In order to control the grand total accumulator wheels 42 a vertical link 55 (Fig. 4), hereinafter referred to as the grand total link, is provided. This link 55 passes between two pins 56, 57 on a rocking plate 58 secured to a grand total shaft 59 and the link 55 has a head 60 provided with two slots 61, 62 which co-operate with the pins 56 and 57 in a manner similar to that in which the slots 49, 50 in the head 48 on the sub-total link 47 co-operate with the pins 45, 46.

The grand total accumulator wheels 42 are mounted on a shaft 420 carried in cam slots 421 in two rocking plates 422 of which only one is shown in Fig. 6. Each plate 422 is mounted on a pivot 423 and is formed with a tail 424 having a slot 425 in which engages a pin 426 in an arm 427 freely mounted on the grand total shaft 59. The arm 427 carries a pin 428 which rests against a plate 429 secured to the shaft 59. A spring 430 tends to maintain the pin 428 in contact with the plate 429.

When the shaft 59 rocks clockwise (Fig. 6) the plate 429 acting through the pin rocks the tail 424 counter-clockwise and the cam slots 421 bring the wheels 42 out of engagement with the sectors 29.

If then the shaft 59 is rocked counter-clockwise back to the position shown in Fig. 6 the spring 430 pulls the arm 427 also counter-clockwise whereby the tail 424 is rocked clockwise thereby effecting engagement of the wheels with the sectors, the spring 430 acting as a safety device to prevent damage.

At its lower end the grand total link is pivoted to a bell crank 63, which is pivoted to the frame at 64 and carries a roll engaging in a cam track 66 formed in the disc 53 on the opposite side thereof from that in which the cam track controlling the link 47 is formed.

When the machine is at rest (position 298° in timing diagrams, Figs. 15 to 17) and set for adding operations both the sub and grand total accumulator wheels 41 and 42 are in engagement with their sectors 27 and 29 and the vertical sub and grand total links 47 and 55 are in their lowermost positions. Also each of these links is in a lateral position such that its slotted head 48 and 60 respectively is in engagement with the left hand pin (45 and 56) on the corresponding rocking plate (43, 58) as shown in Fig. 4. Consequently an upward movement of the sub and grand total links will rock the plates 43 and 58 to bring the accumulator wheels out of engagement.

When the main shaft 1 turns, the cams in the disc 53 lift both the sub and grand total links 47 and 55 before the sectors 27 and 29 commence to move out from zero and consequently while the sectors are being set from the stops the accumulator wheels are out of engagement.

Before the sectors commence to return the cam disc 53 on the main shaft lowers both the sub and grand total links, thereby putting the accumulator wheels into engagement so that as the sectors return they transfer the item read from the card to both sub and grand total accumulators.

When a total is to be taken a shaft 86 (Figs. 1 and 4) hereinafter referred to as the front total shaft is rocked and sets the mechanism which controls the total taking operation as will be explained later.

The rocking movement of the front total shaft

86 is initiated by the designation pin box 6 in the following manner:

As already mentioned the designation pin box 6 is constructed in substantially the same manner as the pin box described in U. S. patent specification No. 1,661,684, and includes a plurality of testing bars 87, one for each column (Fig. 3).

The bars 260 correspond to the slides 48 in U. S. patent specification No. 1,661,684 and are connected at their ends by transverse rods 250 which are pivoted to the upper ends of levers 251 which correspond to the bell cranks 57 in the aforesaid U. S. specification.

Pivoted at 253$a$ to each lifting plate 252 (corresponding to lifting plates 32 in U. S. specification No. 1,661,684) is an arm 253 pivoted at 253$b$ to the pin box frame 254. Each arm 253 has a cam surface 254 at its free end which co-operates with a pin 255 on the corresponding lever 251.

When the lifting plates 252 rise to reset the pin box 6 in the manner described in U. S. specification No. 1,661,684 the arms 253 rock counter-clockwise about their pivots 253$b$ and the cam surfaces 254 push the levers 251 to the right in Fig. 6 against the action of springs 251$a$. By this means the bars 260 are pushed to the left in Fig. 3.

Figure 2A:
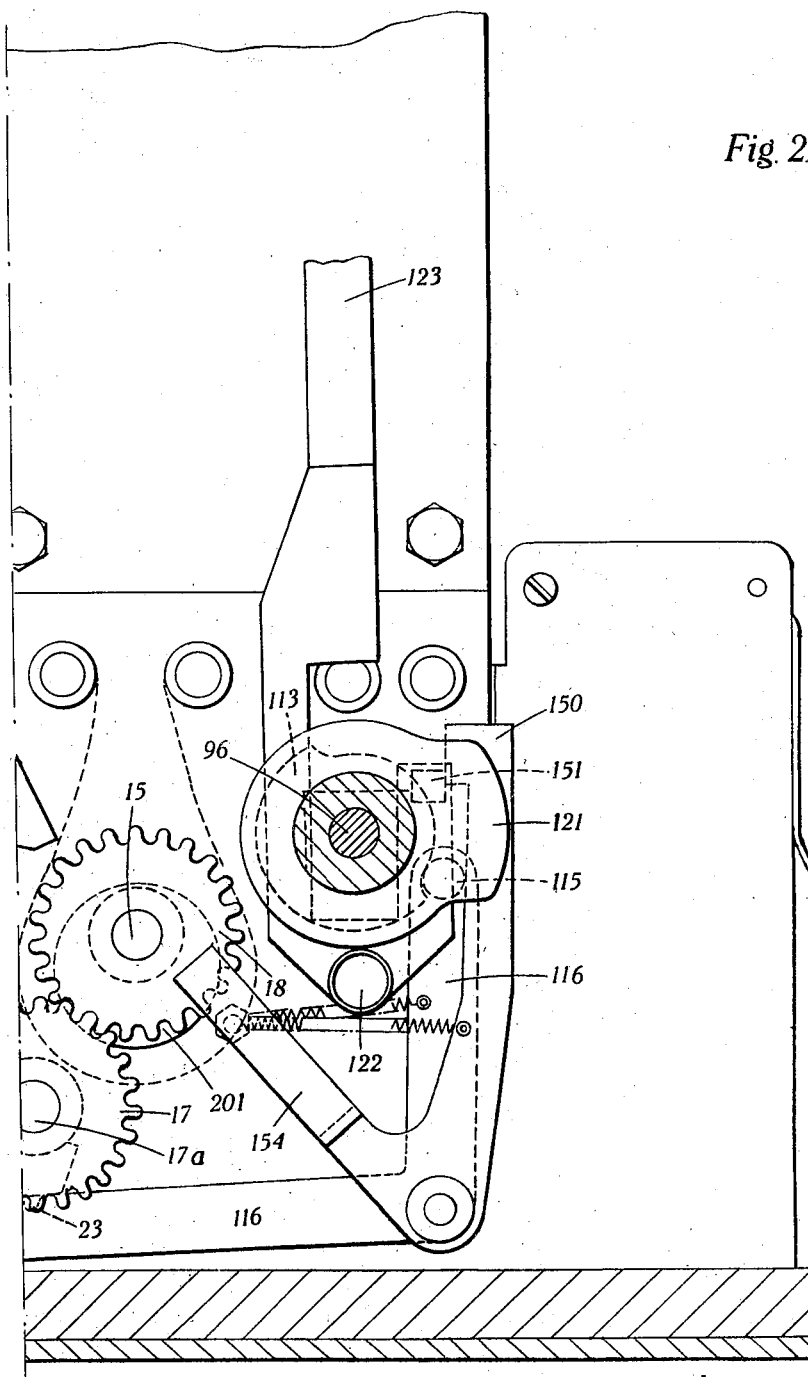

This movement of bars 260 has the same effect as the movement of bars 48 to the right in Fig. 2 of British specification No. 271,935, the difference in the direction of the movement being due to the fact that the projections 261 on bars 260 face in the opposite direction from the projections 50 on slides 48 in the U. S. specification No. 1,661,684.

Each testing bar 87 is formed with a slot 88 at one end, this slot being open upwardly, and disposed adjacent the slotted ends of the testing bars is a frame 89 secured to a shaft 90 and carrying a number of pivoted latches 91, one for each testing bar. Each latch has a projection 92 which can engage in the slot 88 in the end of its associated testing bar when the latch is moved to a given position. By this means any desired number of the testing bars 87 can be coupled to the frame 89.

Secured to shaft 90 is a lever 93 having a spring 93$a$ tending to rock shaft 90 counter-clockwise.

At each cycle of the machine, as long as there is agreement between successive cards passing through the designating pin box, all the testing bars 87 are free to reciprocate as described in specification No. 1,661,684 and they therefore permit rocking of the frame 89 together with the shaft 90 to which it is secured under the action of spring 93$a$. When, however, there is disagreement between two successive cards one or more of these testing bars 87 will be arrested and consequently the frame 89 will fail to rock.

The lever 93 (Figs. 1 and 3) is connected through a link 94 to a clutch control lever 95 pivoted to a fixed stud 95$a$ serving to control a clutch for connecting a shaft 96 (Figs. 1, 2, 3 and 4) to the tabulator main shaft 1. This shaft 96 will hereinafter be referred to as the total shaft.

This clutch comprises a disc 97 (Fig. 3) which is continuously rotated from the tabulator main shaft through a gear wheel 98 secured to the main shaft and engaging a gear wheel 99 which is freely mounted on stud 95$a$ and in turn engages teeth on the periphery of the disc 97, the gear ratio being such that the disc 97 makes one revolution to each three revolutions of the main shaft 1.

Secured to the total shaft 96 is a driven clutch member 100 (Fig. 3) and secured to the disc 97 which is driven from the main shaft are three latches 101 which are normally held by springs 102 in such a position that any one of the latches would engage the clutch member 100 and rotate the total shaft 96.

Normally however the clutch control lever 95 is in such a position that as the disc 97 rotates a lug 103 on the clutch control lever engages each latch 101 as it comes round and deflects it from the clutch member 100 so that it does not engage therewith and the total shaft 96 remains stationary. When a total cycle is to occur, however, the clutch control lever 95 is held out of the path of the latches 101 and consequently one of these latches engages with the clutch member 100 and causes rotation of the total shaft.

Secured to the main shaft 1 is a cam 104 with which engages a roll 105 on one end of the clutch control lever 95, the roll 105 being held in engagement with the cam 104 by a spring 93$a$ attached to the lever 93. The cam 104 is so shaped that while a card is entering the designating pin box 6 and is being sensed the cam 104 holds the clutch control lever 95 clear of the latches 101 on the aforesaid disc 97. Just after the designation sensing pin box 6 has completed its descent the cam 104 releases the clutch control lever 95 which can then move into the path of the latches 101 under the action of spring 93$a$ provided that all the testing bars are free to move, that is to say provided that there is no change in designation. If, however, there is a change the testing bars 87 will fail to move and consequently the frame 90 to which they are connected by their respective latches 89 will also fail to move and this frame, being connected to the clutch control lever 95, will also hold the latter out of the path of the latches 101 on the clutch control disc 97 so that the total shaft 96 will be coupled to said disc and will make one revolution.

The timing of this operation can be seen from the timing diagrams of Figs. 16 and 17.

Considering the revolution of shaft 1 in which the first card of a new group is fed from the magazine, both pin boxes 6 and 200 are down at the commencement of the revolution or cycle. At 40° the pin box 6 commences to rise and is fully up at 160°. As the box 6 rises the card stop 206 releases the last card of the preceding group from the box 6 and this card is conveyed by feed rolls 207 to the item sensing pin box 200. The latter commences to descend at 240° and is fully down at 280°. During its descent the card stop 208 arrests the last card in position for sensing.

At 48° the card picker 205 engages the first card of the new group which is conveyed by the feed rolls 204 to the pin box 6 which commences to descend at 160° and is fully down at 280°. During the descent of the pin box 6 the card stop 206 arrests the first card of the new group in position for sensing.

At 280° the sensing operation is complete and at 283° the cam 104 leaves the roll 105. Since the first card of a new group is being sensed, the testing bars 87 will be unable to move and accordingly roll 105 will be unable to follow the contour of the cam 104. Accordingly lug 203 will not trip any latch 101 and shaft 96 will commence to turn at 335°.

The gear ratio between shafts 1 and 96 is 3 to 1 so that shaft 1 will make three revolutions during one revolution of shaft 96, the point in the revolution of shaft 1 at which the one revolution of shaft 96 commences being 335° on the timing diagram of Fig. 17.

The movement which is permitted to the transverse frame 89 by the reciprocation of the testing bars 87 is relatively small and by employing the above construction a relatively large movement can be permitted to the clutch control lever 95 so that proper operation of the clutch mechanism is always ensured.

During the total taking operation it is necessary to arrest the card feed to the designating pin box 6 and also to arrest the reciprocating movement thereof.

To this end a cam 113 is secured to the total shaft 96 (Fig. 2) with which engages a roller 115 on the end of a bell-crank 116 of which the other end has a lug 117 which, when the bell crank is rocked, trips the pawl 110 connecting the mutilated driving gear wheel 2 to the main shaft 1 so as to uncouple said wheel from the main shaft.

When the total shaft 96 rotates, the cam 123 thereon rocks this bell-crank 116 and as the mutilated gear wheel 2 rotates a tail 110a of the pawl secured thereto engages with the lug 117 on the end of the bell-crank 116 whereby, not only is the pawl 110 withdrawn from engagement with the clutch dog 111, but also the gear wheel 2 is positively arrested. By this means the shaft 4 which actuates the designation pin box 6, and the card picker is arrested when the pawl 110 is disengaged. Moreover the item pin box is also driven from the gear wheel 2 to which the wheel 16 is attached. Consequently the operation of the item pin box is also arrested.

The arrest of these parts occurs at 15° in the revolution of the main shaft 1 following that in which the first card of the new group was fed to the pin box 6, and the parts are held in the arrested position by a detent 233 engaging a notch 234a in a disc 234 secured to the sleeve 2a, said detent having a spring 235.

As can be seen from the timing diagram Fig. 17, at the stopping point 15° the item pin box 299 is up, having released the last card of the old group and the designation pin box 6 is down. Accordingly the first card of the new group is retained in the pin box 6, until the latter is permitted to move upwardly. The card picker is in the retracted position since it does not engage a card until 48° in the revolution of the shaft 1.

Secured to the total shaft 96 is a cam 106 the function of which is to raise the lifting plates 252 in order to reset the pin box 6 in the manner described in U. S. specification No. 1,661,684. Co-operating with this cam 106 is a lever 107 pivoted to the machine frame at 107a. Secured to lever 107 is a lever 108 pivoted to a link 108a at 108b. Link 108a is pivoted at 108c to an arm 108d secured to a shaft 109a freely mounted in the frame of pin box 6. Secured to shaft 109a are two arms 109, one at each end, (of which only one appears in Fig. 3) each arm 109 being pivoted at 109b to the corresponding lifting plate 252.

As already mentioned the pin box 6 is arrested at 15° in the revolution of the main shaft 1 following that in which the first card of the new group was fed to the pin box 6. At 90° in the same revolution the cam 106 commences to rock the lever 107 counter-clockwise (Fig. 4) thereby gradually raising the lifting plates 252 until at 328° in the next following revolution of the main shaft 1 the roller 107b on lever 107 drops off the shoulder 106a of cam 106 under the action of the spring 252a pulling on the lifting plate 252 whereby the latter are suddenly lowered again.

By this means the recording elements 45 described in U. S. specification No. 1,661,684 and indicated at 258 in the Fig. 3 of the present specification are released by the slides 260 to take a record of the designation on the first card of the new group which is in the pin box 6 while the latter is stationary and then locked again in the new position by the return of the slides 260.

The setting of the elements 258 to the new designation permits the testing bars 87 to move under the action of the spring 93a so that the clutch control lever 95 is again released to the control of the cam 104, which permits it to move into the path of the latches 101 on the clutch control disc 97 thereby withdrawing from the clutch dog 100 the latch which was in engagement therewith so that rotation of the total shaft 96 ceases, the latter being held in the stop position by a detent 236 (Fig. 1) urged by a spring 237 into engagement with a notch in a disc 238 fast to shaft 96.

Also secured to the total shaft 96 is a cam 121 (Fig. 2) which engages with a roll 122 on a link 123 (Figs. 1 and 2) connected through a bell crank plate 124 and link 125 to an arm 126 secured on the front total shaft 86, whereby the latter is rocked. Pivoted to an arm 128 secured on the other end of the front total shaft 86 is a link 127 (Figs. 1 and 4) hereinafter referred to as the side total link which serves to position the sub-total link 47 and the grand total link 55.

Secured to the side total link 127 by means of screws 127a is a guide 127b (Figs. 4 and 9) having a slot 127c with which engages a stud 127d attached to the machine frame.

Mounted on the side total link 127 are two pairs of sliding blocks 129, 130 and 131, 132 (Figs. 8–11) the individual blocks of each pair being pulled towards one another by springs 133, 133a respectively. Between the blocks 129, 130 of one pair passes the sub-total link 47 and between the blocks 131, 132 of the other pair passes the grand total link 55.

Each block is formed with lugs 135 embracing the link 127 and carries a pin 129a, 130a, 131a and 132a respectively, the pins engaging in slots 129b, 130b, 131b and 132b in the link 127, whereby each block can slide to a limited extent along the link 127.

Fig. 9 shows the position of these blocks during adding cycles of the machine, during which the side total link remains in its extreme position to the left in Figs. 4 and 9 (to the right in Fig. 8). In this position the pins 129a and 131a are at the left hand end of the respective slots 129b and 131b, and the pins 130a and 132a are at the right hand end of the respective slots 130b and 132b.

The construction of the pairs of blocks will now be described with reference to the pair of blocks 129, 130, that of the other pair being the same.

The block 129 has an extension 129c which slides over a similar extension 130c of the block 130 (see particularly Fig. 11). These extensions are spaced away from the link 127 and in the space X (Fig. 11) left between the extensions and the link 127 each block is formed with a curved abutment 129d, 130d. Between these abutments passes the sub-total link 47, this link being lightly clamped between the abutments by means of the spring 133. The link 127 and the extensions 129c, 130c serve to guide the upper part of the link 47 in its vertical reciprocating movement.

When the side total link 127 is pulled by the front total shaft the wheels 41, 42 of both accumulators are in engagement with their sectors 27, 29 and both the sub- and grand-total links 47, 55 are positioned so that their slotted heads 48, 60 are in engagement with the left hand pins 45, 56 on the associated rocking plates 43, 58.

The movement of the side total link 127 acting through the pairs of blocks 129, 130 and 131, 132 mounted thereon tends to pull both the sub- and grand total links over so that their slotted heads 48, 60 can engage the right hand pin 46, 57 on the respective rocking plate 43, 58.

Since the grand total accumulator 42 prints its totals from the type carried by the sectors 27 of the sub-total accumulator 41 it is necessary that on a total cycle the sub-total accumulator wheels shall not engage with their sectors at the same time as the grand total accumulator wheels engage with their sectors.

Accordingly although the movement of the side total link 127 tends to move both the sub and grand total links 47, 55 into the position in which their slotted heads 48, 60 can engage with the right hand pins 46, 57 on the respective rocking plates 43, 58, interlocking means is provided for holding the grand total link 55 in the position in which its slotted head 60 engages with the left hand pin 56 on the associated rocking plate 58 when the sub-total link 47 is free to move into the position in which its slotted head 48 can engage with the right hand pin 46 on the associated rocking plate 43 and vice versa.

The interlocking means comprises a lever 138 (Figs. 4 and 12) pivoted to the machine frame at 139 and having a projection 140 co-operating with one arm 141 of a bell crank pivoted to the frame at 142 and of which the other arm 143 is positioned to be raised by a connection wire 144 in the connection box 216 of the machine, this connection wire being raised by the sensing of a hole in a particular position in a card which is inserted in the pack when a grand total is desired. A spring 145 pulls the arm 141 of the bell crank over to the right and a spring 146 pulls the arm 140 over to the left. The spring 146 is stronger than the spring 145 so that the arm 140 is held over to the left.

When the links 47 and 55 are in their lowermost positions and the machine is set for adding the end 138a of the lever 138 stands in engagement with a lug 147 on the grand total link 55 while a projection 138b on the other end of the lever 138 is clear of a lug 148 on the sub-total link 47.

The lugs 147 and 148 are provided with slots 147a, 148a engaging with pins 147b, 148b on the links 55 and 47 respectively. Springs 147c and 148c normally hold the lugs 147 and 148 in their lowermost positions.

When the machine is performing adding operations the side total link 127 is over to the left in Figure 4. The grand total link 55 is also over to the left with the left hand slot 61 in engagement with the left hand pin 56 on the disc 58. The sub-total link 47 is also over to the left with the left hand slot 49 in engagement with the left hand pin 45 on the plate 43. As can be seen from the timing diagram of Fig. 15 during adding cycles both links 47 and 55 commence to move up at 132° and finish their upward movement at 164°. This movement of the links effects engagement of the sub and grand total accumulators with their sectors.

In this condition of the machine the pairs of blocks 129 and 131 mounted on the side total link 127 are in positions such that their pins 129a, 131a are at the left hand ends of the respective slots 129b and 131b in the side total link (Fig. 9) and the blocks 130, 132 are positioned so that their pins 130a, 132a are at the right hand end of their slots 130b, 132b. At the same time both abutments 129d, 130d, are in engagement with opposite edges of the sub-total link 47 and both abutments 131d, 132d are in engagement with opposite edges of the grand total link 55 (see Fig. 9).

During an adding cycle the side total link 127 remains in its left hand position. An adding cycle of the machine is conveniently defined as commencing at 328° on the timing diagram of Fig. 15 and at this point the sub and grand total accumulator wheels 41 and 42 are commencing to move out of engagement with their sectors 27 and 29. At 350° the restoring bar 30 commences to move forwardly away from the sectors 27 thereby releasing them so that they can move forward to take a setting from the stops 26.

The restoring bar is actuated by the cam 40 on the main shaft 1 which operates the sector restoring shaft 35 through the lever 38 and link 37 while the sector restoring shaft operates the restoring bar 30 through the arm 34, link 33 and arms 31.

The movement of the accumulator wheels out of engagement is completed at 360° and the forward movement of the restoring bar is completed at 70° in the next revolution of the shaft 1.

The disengagement of the accumulator wheels from their sectors is effected by the links 47 and 55 which commence to rise at 328° whereby the disc 58 and plate 43 are rocked in a clockwise direction.

The item sensing pin box 200 commences to descend at 240° in the same cycle as that just referred to above and is fully down with the pins through the holes in the card at 280° remaining down until 320° when it commences to rise again to set the stops 26, the stop setting being completed at 360° when the pin box 200 is fully raised.

The shutter 240 which corresponds to the shutter 26 in British specification No. 401,012 is operated between 275° and 305° by means of a roller 241 attached to the wheel 16 and acting on a lever 242 pivoted to the machine frame at 243 and at its other end to an arm (not shown) secured to the shutter operating shaft 244. The lever 242 and shaft 244 are the same as the lever 35 and shaft 29 described in British patent specification No. 401,012 and their manner of operation is the same as that described in that British specification.

As already mentioned the forward movement of the restoring bar 30 is completed at 70° in the next revolution of the shaft 1 and at this point the sectors have received their setting from the stops 26. Then at 132° the links 47 and 55 commence to descend whereby the disc 58 and plate 43 are rocked in a counter-clockwise direction to effect engagement of the sub and grand total accumulator wheels with their sectors. This motion is completed at 164°. At 180° the restoring bar 30 commences to return thereby restoring the sectors to zero. The zero position is reached at 245° but the restoring bar continues to move rearwardly until 268° is reached in order to permit carrying to occur in those denominations in which it is necessary, in the manner described in U. S. specification No. 1,245,502 issued November 6, 1917. During the rearward movement of the bar 30 the amount to which the sectors were set is transferred to the accumulator wheels 41 and 42.

When a sub-total cycle is to occur the total shaft 96 (Figs. 1-5) is caused to make one revolution by means of the clutch comprising the latches 101 controlled by designating pin box 6 in the manner already described. The revolution of the total shaft 96 causes the cam 121 to pull the link 123 downwardly whereby the front total shaft 86 is rocked in a counterclockwise direction and the side total link 127 is pulled to the right.

In order to explain the timing of a sub total taking operation it is necessary to consider four revolutions of the shaft 1 which are diagrammatically illustrated in Fig. 16.

At 40° in the first of these revolutions the designation sensing pin box 6 commences to rise and is fully up at 160°. During this upward movement the last card of the old group is released by the card stop 206 and conveyed to the item sensing pin box 200 by the feed rolls 207.

The pin box 200 commences to descend at 240° and is fully down at 280° the last card being arrested by the card stop 203. At 320° the pin box 200 commences to rise and is fully up at 360° whereby the stops 26 are set to the amount punched in the last card.

At 48° in this first revolution the first card of the new group is engaged by the card picker 205 and is conveyed by feed rolls 204 to the designation sensing pin box 6. At 160° the latter commences to descend, the first card being arrested during this descent by the card stop 206, and the descent being completed at 280°.

Also during this first revolution the sectors 27 and 29 move forward to take a setting from the stops 26 which were set to the amount of the last card but one of the old group during the preceding revolution of the shaft 1. The restoring bar 30 commences moving forward to permit the sectors to move from their carry position at 335° in this preceding revolution and the sectors are at zero at 0° in the first of the four revolutions under consideration. The forward movement of the sectors is completed at 70° in the first revolution and at 132° the sub and grand total accumulator wheels 41 and 42 commence to move into engagement with the sectors, the engagement being completed at 164°.

At 180° the sectors commence to return to normal position and reach zero at 245° whereby the amount to which they were set (i. e. the amount punched on the last card but one) is entered into the sub and grand total accumulator wheels. The sectors continue to move rearwardly however until 268° to permit carrying to occur in any denomination in which it is required.

At 335° in this first revolution the sectors commence to move forward again.

At 283° in this first revolution the cam 104 leaves the roll 105 but since a change in designation has been detected the latter is unable to descend into the gap in the cam and accordingly the one revolution of the total shaft 96 is initiated in the manner already described. This revolution commences at 335° in the first revolution of the shaft 1.

At 15° in the second revolution of the shaft 1 the gear wheels 2 and 16 are arrested and consequently the pin boxes 6 and 200 and the card picker are also arrested.

At 70° in the second cycle the sectors have completed their forward movement and have taken a setting from the stops 26 which at 0° were set to the amount punched in the last card of the old group. At 132° in the second revolution the sub and grand total accumulator wheels 41 and 42 commence to move into engagement with the sectors, the engagement being completed at 164°.

At 180° the sectors commence to return to normal position and reach zero at 245° whereby the amount of the last card is transferred to the wheels 41 and 42. The sectors continue to move rearwardly until 268° to permit carrying to occur.

At 335° in the second revolution the restoring bar 30 commences to move forward again but the sectors do not follow it beyond the zero position in which they are arrested by the nought stops 26a (position 360°).

At 70° in the third revolution the restoring bar 30 is fully forward and commences to return at 180° being fully restored at 268°. This operation of the restoring bar is idle as far as adding is concerned and serves the purpose of restoring any sectors which were tripped for carrying during the preceding revolution. At 335° the restoring bar commences to move forward again.

At 315° in the third revolution of the shaft 1 the cam 121 on the total shaft 96 pushes the link 123 downwards and thereby rocks the front total shaft 86 whereby the side total link is pulled to the right in Figs. 4 and 9 (left in Fig. 8).

When the cam 121 pulls the link 123 down a latch 150 moves into engagement with a pin 151 on the link 123 to hold it down during the ensuing total taking operation.

At the moment when the link 127 is pulled to the right the links 47 and 55 are in their lowermost positions with the wheels 41 and 42 in engagement with the sectors and the lever 138 is positioned so that its end 138a is in engagement with the lug 147 on the link 55. The lug 138b on the other end of the lever 138 is, however, located to one side of the path of the lug 148 on the link 47.

Consequently when the side total link 127 moves to the right (Figs. 4 and 9) the block 129 moves with it owing to the engagement of the pin 129a on the blocks 129 with the left hand end of the slot 129b on the link 127. The spring 133 causes the other block 130 to follow this movement and by means of the abutment 130d to push the link 47 over to the right (Fig. 4) until the face 48a (Fig. 4B) of the slotted head 48 comes to rest against the right hand pin 46 on the rocking plate 43. When this occurs the link 47 and block 130 are arrested. The link 127, however, completes its movement, relative movement between the link 127 and block 130 being permitted by the slot 130b.

At the same time the block 131 moves over to the right with the side total link 127. The other block 132 however cannot move with the side total link since the abutment 132d of this block is bearing against the left hand edge of the link 55 which is held against movement to the right by the engagement of lug 147 with lever 138. Consequently the spring 134 stretches and the side total link moves independently of the block 132, this movement being permitted by the slot 132b.

The downward movement of the link 123 rocks the front total shaft 86 and sets the sub and grand total links 47 and 55 in the manner described above. At 328° in the third revolution of the main shaft the cam tracks in the disc 53 commence to raise the sub and grand total links 47 and 55. When the sub total link begins to rise the surface 48a of its head 48 is resting against the right hand pin 46 on the rocking plate 43. Consequently the link 47 rises idly and does not rock the plate 43, therefore the sub-total accumulator wheels 41 are left in engagement with their sectors 27 at the time when the latter are released by the restoring bar 30. Consequently the sectors move out from zero position rotating the sub-total accumulator wheels 41 backwards as they move so that the sectors 27 are arrested by the sub-total accumulator wheels reaching zero and are therefore set to print the amount of the sub-total.

When the link 47 reaches its uppermost position at 360° in the third revolution the spring 133, by pulling on the left hand sliding block 130, pulls the link 47 still further to the right thereby causing the right hand slot 50 to engage with the right hand pin 46. Hence on the ensuing downward movement of the link 47 commencing at 132° in the fourth revolution the plate 43 is rocked in a clockwise direction whereby the accumulator wheels 41, now at zero, are brought out of engagement with the sectors 27. The latter are then restored to normal position by the restoring bar 30, between 180° and 268° in the fourth revolution.

After the links 47 and 55 have been lowered again the latch 150 is released at 265° in the fourth revolution by an arm 153 acting on an arm 154 of the latch 150, the arm 153 being driven by a gear wheel 155 (Figs. 3 and 5) which engages with the teeth on the disc 97. The gear ratio between wheel 155 and disc 97 is 3:1. On release of the latch 150 a spring 28b restores the front total shaft to normal position and brings the side total link 127 back to its left hand position. When the link 127 moves to the left the block 130 is moved with it owing to the engagement of the right hand end of the slot 130b with the pin 130a. The spring 133 pulls the other block 129 over to the left also, thereby swinging the sub total link 47 over to the left. At this moment the plate 43 is in the position in which the sub-total accumulator wheels 41 are out of engagement with the sectors, i. e. the pin 45 is above the level of pin 46, and consequently when the link 47 swings to the left the surface 48d of its slotted head 48 will engage with the left hand pin 45. Consequently the block 129 cannot completely follow the movement of the block 130 and the spring 133 extends.

At approximately 225° in the third revolution the cam 113 on the shaft 96 releases the lever 116 whereby the pawl 110 is released so that when the shoulder 111 on the clutch member 112 comes round into engagement with the pawl 110 the gears 2 and 16 start to move again. This resumption of the movement of gears 2 and 16 occurs at 15° in the fourth revolution.

At 40° in the fourth revolution the designation pin box 6 commences to rise and is fully up at 160°. During this movement the card stop 206 releases the first card of the new group which is then conveyed by feed rolls 207 to the item sensing pin box 209. The latter commences to descend at 240° in the fourth revolution and is fully down at 280°. During the descent of this pin box the card stop 208 arrests the first card of the new group for sensing.

At 48° in the fourth revolution the second card of the new group is fed by the picker to the pin box 6.

At 320° in the fourth revolution the item pin box 200 commences to rise thereby setting the stops 26 to the value of the first card of the new group and at 360° these stops are set.

As already mentioned at 265° in the fourth revolution the link 127 is moved to the left thereby swinging the link 47 to the left whereby the surfaces 48b of the slotted head 48 engages with the left hand pin 45, the sub total accumulator wheels 41 being at this time out of engagement with the sectors.

At 328° in the fourth revolution the links 47 and 55 rise again the movement being completed at 360°. This movement is idle and at 360° the sliding block 129, under the action of the spring 133 swings the link 47 still further to the left thereby causing its left hand slot 49 to engage the left hand pin 45.

At 335° in the fourth revolution the restoring bar 30 swings forward, permitting the sectors to move out to the stops 26 which are set at 360° in the fourth revolution to the amount of the first card of the new group. This setting of the sectors is complete at 70° in the fifth revolution. At 132° in the fifth revolution the links 47 and 55 commence to descend whereby the accumulator wheels are engaged with the sectors and at 160° in the fifth revolution the restoring bar commences to return the sectors whereby the amount of the first card of the new group is transferred to the accumulator wheels. Further adding operations then continue until another change in designation is detected.

Referring now to the grand total link 55, during the cycle of the main shaft in which the last card of the old group is added the grand total link 55 remains over to the left with its slot 61 in engagement with the left hand pin 56 on the rocking disc 58. Consequently during this cycle of the main shaft the grand total link 55 rocks the grand total shaft 59 clockwise to bring the accumulator wheels 42 out of engagement before the sectors 29 move away from zero position and then rocks the shaft 59 in the reverse direction to effect engagement of the accumulator wheels 42 with the sectors 49 after the latter have been set; thus when the sectors 29 return to zero position the amount to which they have been set from the last card of the group is added into the grand total accumulator 42.

The idle cycle for the purpose of restoring the transfer mechanism then occurs, after which the side total link 127 is pulled to the right as described above.

When the side total link 127 is pulled to the right (Fig. 4) on a sub-total cycle (at 315° in the third revolution of the shaft 1), the block 131 follows its movement owing to the engagement of the left hand end of the slot 131b with the pin 131a. The other block 132 however cannot move at all, since its abutment 132d rests against the left hand edge of the link 55 and the lug 147 on this link in turn rests against the end 138a of the interlocking lever 138. Consequently the spring 133a extends and the slot 132b moves relatively to the pin 132a.

The grand total link 55 therefore remains in the position shown in Fig. 4. Accordingly at 380° in the third revolution of the main shaft the upward movement of the grand total link 55 takes the grand total accumulator wheels 42 out of engagement with their sectors 29 before the latter move from the normal position.

At the end of the upward movement of the grand total link 55 (360° in the third revolution) the lug 147 has passed above the plane of the interlocking lever 138 and thereupon the spring 133a connecting the two blocks 131 and 132, between which the grand total link passes, pulls the block 132 and the grand total link over to the right until the surface 60a of its slotted head 60 abuts against the right hand pin 57 of the rocking disc 58. During its ensuing downward movement (132° to 164° in the fourth revolution) the grand total link moves idly, the grand total accumulator wheels remaining out of engagement so that the sectors 29 can be returned to normal position without affecting the grand total accumulator.

It will be understood that the grand total sectors 29 are, during this operation, positioned by the sectors 27 which in turn are set to print the sub total by the zeroising of the sub-total accumulator wheels 41. The grand total accumulator wheels 42 however are not engaged with the sectors 29 during a sub total operation so that although the sub total is printed and the sub total accumulator 41 is zeroised the amount of the grand total is still retained in the grand total accumulator wheels 42.

Also during the downward movement of the grand total link 55 the lug 147 thereon remains in its upper position since it now overlies the interlocking lever 138, the spring 147c extending to permit this relative movement.

During a sub-total stroke the side total link 127, as explained above, moves back to the left (at 265° in the fourth revolution) and pushes both the sub and grand total links 47 and 55 back to the left, the link 55 being moved to the left by the block 131, which is pulled to the left by the block 132 acting through the spring 133a. The block 132 is positively pushed to the left by the link 127 since the right hand end of the slot 132b acts directly on the pin 132a. When this occurs the surface 60b of the slotted head 60 of the grand total link 55 abuts against the left hand pin 56 on the disc 58. Between 328° and 360° in the fourth revolution of the main shaft the grand total link 55 rises idly until at the upper end of its stroke when the slot 61 registers with the pin 56, the spring 133a acting through the block 131 pulls the link 55 further to the left, thereby effecting engagement between the slot 61 and pin 56. Then during the following downward movement of the link 55 (132° to 164° in the fifth revolution) the disc 58 is rocked in a counterclockwise direction to move the grand total accumulator wheels 42 into engagement with the sectors 29. The grand total accumulator wheels are now in condition to commence a further series of adding operations.

It may here be pointed out that on a total cycle it is necessary to lower the nought stops 26a in the stop basket (Figs. 6 and 14) of the tabulator in order to permit the sectors 27 to take a setting from the accumulator wheels. In order to effect this lowering of the nought stops on a sub-total operation each of the nought stops 26a is pivoted at 156 to a bell crank 157 pivoted on a shaft 158 and normally held by a spring 159 in a position in which the nought stop 26a is raised. In this position an upwardly directed arm 160 of each bell crank lies adjacent a bail 161 secured to a shaft 162 (Figs. 1 and 6) on which is mounted the bell crank plate 124 through which the front total shaft 86 is rocked. Accordingly, when on a total cycle, the front total shaft 86 is rocked the bail 161 is also rocked and pushes all the bell cranks 157, 158 in a clockwise direction, whereby all the nought stops 26a are pulled down against the action of their springs 163.

When it is desired to print a grand total the interlocking lever 138 is displaced by means of a grand total card having a hole in a particular position.

This card is inserted in the pack of item cards at the end of the last sub-group within the main group of cards of which a grand total is to be printed.

In such a case the change in designation from the last card of the last sub-group to the grand total card causes a sub-total cycle to occur and the front total shaft 86 to rock, whereupon the operations described above occur.

As already explained at 15° in the fourth revolution the gears 2 and 16 start to move again and at 40° in the fourth revolution the designation pin box 6 commences to rise and is fully up at 160°. During this movement the card stop 206 releases the grand total card from the pin box 6, and this card is conveyed to the item pin box 200. The latter commences to descend at 240° in the fourth revolution and is fully down at 280°. During the descent of this pin box the card stop 208 arrests the grand total card for sensing.

At 48° in the fourth revolution the first card of the new group is fed by the picker to the pin box 6.

At 320° in the fourth revolution the item pin box 200 commences to rise whereby the connection wire 144 is raised, this movement being completed at 360° in the fourth revolution. By this means the bell crank 143, 141 is rocked and swings the interlocking lever 138 about its pivot 139 so that the end 138a of the lever 138 is swung to a position behind the path of the lug 147, whereby the lever 138 does not interfere with the movement of the grand total link 55 to the right. At the same time the other end of the lever 138 which has a recess 138c is moved into the path of the lug 148 on the sub total link 47.

The movement of the lever 138 occurs at a time when the sub total link 47 is raised and after the lever 138 has moved the recess 138c therein is disposed below the lug 148 on the link 47. Then when the link 47 descends again the lug 148 passes down through the recess 138c so that the bottom of the recess prevents the link 47 from moving to the right when the side total link 127 moves to the right.

In order to hold the lever 138 in this position a latch is provided. This latch comprises a lug 165 on a lever 166 (Fig. 4) pivoted to the machine frame between its ends at 167 and having its other end connected by a link 168 to a lever 169 also pivoted between its ends to the machine frame.

Normally the lug 165 engages the underside of the arm 141 of the bell crank 141, 143 as shown in Fig. 4. When the bell crank is rocked anticlockwise in Fig. 4 by the action of the connection box wire 144, the lever 166 is rocked anticlockwise under the action of a spring 170 whereupon the lug 165 moves into the path of the arm 141 and prevents said arm and the lever 138 from returning to their normal positions.

While the grand total card is being sensed in the item sensing pin box the first card of the next group is being sensed in the designation pin box which accordingly detects a change in designation from the grand total card to the first card of the new group. Consequently the total shaft 96 is caused to make a second revolution during which the main shaft 1 makes three further revolutions. This second revolution of shaft 96 begins at 335° in the fourth revolution of the shaft 1.

Towards the end of the one revolution of the total shaft 96 a cam (not shown) on this shaft rocks the lever 169 anticlockwise whereby the lever 166 is also rocked anticlockwise and the arm 141 is allowed to return under the action of spring 146 (Fig. 12) to the position shown in Fig. 4.

During the fifth revolution of the main shaft the sub and grand total links 47 and 55 operate as for an adding operation but since no item is punched in the grand total card nothing is added into the accumulators. The sixth revolution of the main shaft constitutes an idle cycle and at 315° in this revolution the side total link 127 is pulled to the right. When the side total link 127 is pulled to the right at 315° in the sixth revolution, since the grand total link 55 is free to move therewith the link 55 moves over to the right until the surface 60c of its head 60 abuts against the right hand pin 57 of the disc 58. Then at 328° in the sixth revolution, when the grand total link 55 rises, the disc 58 remains stationary and when the link 55 reaches its uppermost position at 360° the slot 62 engages the pin 57 so that during the downward movement of the link 55 which occurs between 132° and 164° in the seventh revolution the disc 58 and the grand total shaft 59 are rocked in a clockwise diection, thereby bringing the grand total accumulator wheels out of engagement. While the link 55 was rising, however, the sectors 27 were released by the restoring bar 30 and accordingly these sectors, through the links 28 and sectors 29, were set to the amount of the grand total held in the grand total accumulator wheels 42, these wheels being returned to zero by the movement of the sectors 29. Thus, after the grand total link 55 has moved down at 164° in the seventh revolution of the main shaft the grand total wheels 42 are at zero and out of engagement with their sectors.

At approximately 225° in the sixth revolution the cam 113 on the shaft 96 releases the lever 116 whereby the pawl 110 is released so that when the shoulder 111 on the clutch member 112 comes round into engagement with the pawl 110 the gears 2 and 16 start to move again. This resumption of the movement of the gears 2 and 16 occurs at 15° in the seventh revolution.

At 40° in the seventh revolution the designation pin box 6 commences to rise and is fully up at 160°. During this movement the card stop 206 releases the first card of the new group which is then conveyed by feed rolls 207 to the item sensing pin box 200. The latter commences to descend at 240° in the fourth revolution and is fully down at 280°. During the descent of this pin box the card stop 208 arrests the first card of the new group for sensing.

At 48° in the seventh revolution the second card of the new group is fed by the picker to the pin box 6.

At 320° in the seventh revolution the item pin box 200 commences to rise thereby setting the stops 26 to the value of the first card of the new group and at 360° these stops are set.

The side total link 127 then returns to the left at 265° in the seventh revolution whereby the link 55 is swung over to the left and the surface 60b of the head 60 comes to rest against the left hand pin 56. At 328° in the seventh revolution of the main shaft the link 55 rises idly until at the top of its stroke the slot 51 engages the pin 56. At 335° in the seventh revolution the restoring bar 30 swings forwards, permitting the sectors to move out to the stops 26 which are set at 360° in the seventh revolution to the amount of the first card of the new group. This setting of the sectors is complete at 70° in the eighth revolution. At 132° in the eighth revolution the links 47 and 55 commence to descend whereby the accumulator wheels are engaged with the sectors and at 160° in the eighth revolution the restoring bar commences to return the sectors whereby the amount of the first card is transferred to the accumulator wheels. Further adding operations then continue until another change in designation is detected.

When, during a grand total operation the side total link 127 moves to the right at 315° in the sixth revolution the sub-total link 47 is prevented from following this movement by engagement of the lug 148 with the bottom of the recess 138c in the interlocking lever 138. Consequently the ensuing upward movement of the link 47 at 328° in the sixth revolution takes the sub-total accumulators out of engagement before the sectors 27 are set from the grand total accumulator wheels.

When the link 47 reaches its uppermost position at 360° in the sixth revolution the lug 148 is above the bottom of the recess 138c and therefore the link 47 swings to the right until the surface 48c of its head 48 comes to rest against the right hand pin 46 on the rocking plate 43.

The link 47 then descends again between 132° and 164° in the seventh revolution and after it reaches the bottom of the stroke the side total link 127 moves back to the left at 265° in the seventh revolution taking the link 47 with it until the surface 48d of the head 48 rests against the pin 45. Then the link 47 rises again between 328° and 360° in the seventh revolution and on reaching the top of its stroke the recess 49 engages the pin 45 so that when the link 47 descends, the sub-total wheels 41 between 132° and 164° in the eighth revolution are put into engagement with the sectors 27.

What I claim is:

In a calculating machine having a total shaft and two accumulators the combination of two accumulator controlling links, means for reciprocating said links longitudinally, said links being normally disposed in a position in which they cause the accumulators to effect adding operations, a setting link common to both control links and movable transversely thereof to a totalling position, a pair of blocks for each control link, said blocks being slidably mounted on the setting link, and each control link passing between the ends of the associated pair of blocks, means limiting the extent to which said blocks can slide on said setting link, a spring to each pair of blocks, said spring urging said blocks towards one another, means, including the total shaft, for moving the setting link transversely of the control links into the totalling position, an interlocking device normally positioned to prevent the control link for one accumulator from following the transverse movement of the setting link and means settable between two consecutive operations of the total shaft to move said interlocking device clear of the control link for the one accumulator and into engagement with the control link for the other accumulator, whereby when one or other of said control links is arrested by the interlocking member, one of the blocks of the pair associated with the link which has been arrested moves with the setting link and the spring connecting said block to the other block of said pair extends.

ARTHUR THOMAS.